United States Patent
Yoon et al.

(10) Patent No.: US 12,301,923 B2
(45) Date of Patent: May 13, 2025

(54) ELECTRONIC APPARATUS AND CONTROL METHOD THEREOF

(71) Applicant: SAMSUNG ELECTRONICS CO., LTD., Suwon-si (KR)

(72) Inventors: Daewon Yoon, Suwon-si (KR); Gohwoon Jeong, Suwon-si (KR); Sangshin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 52 days.

(21) Appl. No.: 18/097,691

(22) Filed: Jan. 17, 2023

(65) Prior Publication Data
US 2023/0156266 A1     May 18, 2023

Related U.S. Application Data

(63) Continuation of application No. PCT/KR2021/011670, filed on Aug. 31, 2021.

(30) Foreign Application Priority Data

Oct. 14, 2020     (KR) ........................ 10-2020-0133007

(51) Int. Cl.
*H04N 21/43*     (2011.01)
*H04N 21/431*    (2011.01)
*H04N 21/466*    (2011.01)

(52) U.S. Cl.
CPC ... *H04N 21/43076* (2020.08); *H04N 21/4316* (2013.01); *H04N 21/4661* (2013.01); *H04N 21/4667* (2013.01); *H04N 21/4668* (2013.01)

(58) Field of Classification Search
CPC ......... H04N 21/43076; H04N 21/4316; H04N 21/4661; H04N 21/4667; H04N 21/4668
See application file for complete search history.

(56) References Cited

U.S. PATENT DOCUMENTS

| 8,682,339 B2 | 3/2014 | Xu et al. |
| 8,948,777 B2 | 2/2015 | Xu et al. |

(Continued)

FOREIGN PATENT DOCUMENTS

| KR | 10-0577360 B1 | 5/2006 |
| KR | 10-2009-0020386 A | 2/2009 |

(Continued)

OTHER PUBLICATIONS

International Search Report issued in International Application No. PCT/KR2021/011670 dated Dec. 16, 2021.

(Continued)

*Primary Examiner* — Girumsew Wendmagegn
(74) *Attorney, Agent, or Firm* — STAAS & HALSEY LLP

(57) ABSTRACT

An electronic apparatus comprises: a display; a communication interface; a memory to store first user information corresponding to the electronic apparatus and information of a plurality of other users, respectively; and a processor which controls the display to display recommended content determined based on the first user information, and in response to a content being selected from among the recommended content displayed on the display, controls the display to display identification information corresponding to at least one other user to whom the content selected is displayable based on the plurality of pieces of other users' information, and in response to identification information corresponding to a second user being selected from among the displayed identification information, controls the communication interface to transmit, to an external terminal of the second user, a request signal so that the selected content is displayable on the external terminal of the second user.

15 Claims, 27 Drawing Sheets

(56) References Cited

U.S. PATENT DOCUMENTS

| | | |
|---|---|---|
| 9,124,931 B2 | 9/2015 | Ozawa |
| 9,185,348 B2 | 11/2015 | Choi et al. |
| 9,243,484 B1 | 1/2016 | Van Son |
| 9,473,819 B1 | 10/2016 | Bostick et al. |
| 9,807,345 B2 | 10/2017 | Park et al. |
| 10,277,951 B2 | 4/2019 | Choi et al. |
| 2005/0055713 A1 | 3/2005 | Lee et al. |
| 2009/0271820 A1 | 10/2009 | Choi et al. |
| 2009/0300690 A1 | 12/2009 | Xu et al. |
| 2011/0126251 A1 | 5/2011 | LaFreniere et al. |
| 2011/0185385 A1 | 7/2011 | Park et al. |
| 2012/0062687 A1 | 3/2012 | Sai et al. |
| 2013/0170818 A1 | 7/2013 | Klappert et al. |
| 2014/0130081 A1 | 5/2014 | Ozawa |
| 2014/0157330 A1 | 6/2014 | Xu et al. |
| 2014/0229416 A1 | 8/2014 | Bae et al. |
| 2015/0088988 A1 | 3/2015 | Yuan et al. |
| 2015/0249865 A1 | 9/2015 | Oliveira |
| 2016/0044381 A1 | 2/2016 | Choi et al. |
| 2017/0134688 A1 | 5/2017 | Yoon et al. |
| 2017/0251260 A1 | 8/2017 | Sanders |
| 2017/0257676 A1* | 9/2017 | Rasanen ............ H04N 21/6175 |

FOREIGN PATENT DOCUMENTS

| | | | |
|---|---|---|---|
| KR | 10-2011-0007668 A | 1/2011 | |
| KR | 10-2011-0087806 A | 8/2011 | |
| KR | 10-2014-0102381 A | 8/2014 | |
| KR | 10-1424708 B1 | 9/2014 | |
| KR | 10-1517769 B1 | 5/2015 | |
| KR | 10-1523377 B1 | 5/2015 | |
| KR | 10-2015-0065686 A | 6/2015 | |
| KR | 101685974 B1 * | 12/2016 | ............... H04N 5/44 |
| KR | 10-2017-0054868 A | 5/2017 | |
| KR | 10-2057455 B1 | 12/2019 | |
| KR | 10-2105169 B1 | 6/2020 | |
| WO | WO 99/22495 A2 | 5/1999 | |
| WO | WO 02/11364 A2 | 2/2002 | |
| WO | WO 2008/012488 A2 | 1/2008 | |

OTHER PUBLICATIONS

International Written Opinion issued in International Application No. PCT/KR2021/011670 dated Dec. 16, 2021.

Extended European Search Report dated Aug. 8, 2023 in European Patent Application No. 21880308.8.

Office Action issued Jan. 19, 2025 for Korean Application No. 10-2020-0133007.

Examination Report issued Mar. 11, 2025 for European Patent Application No. 21 880 308.8.

* cited by examiner

FIG. 9
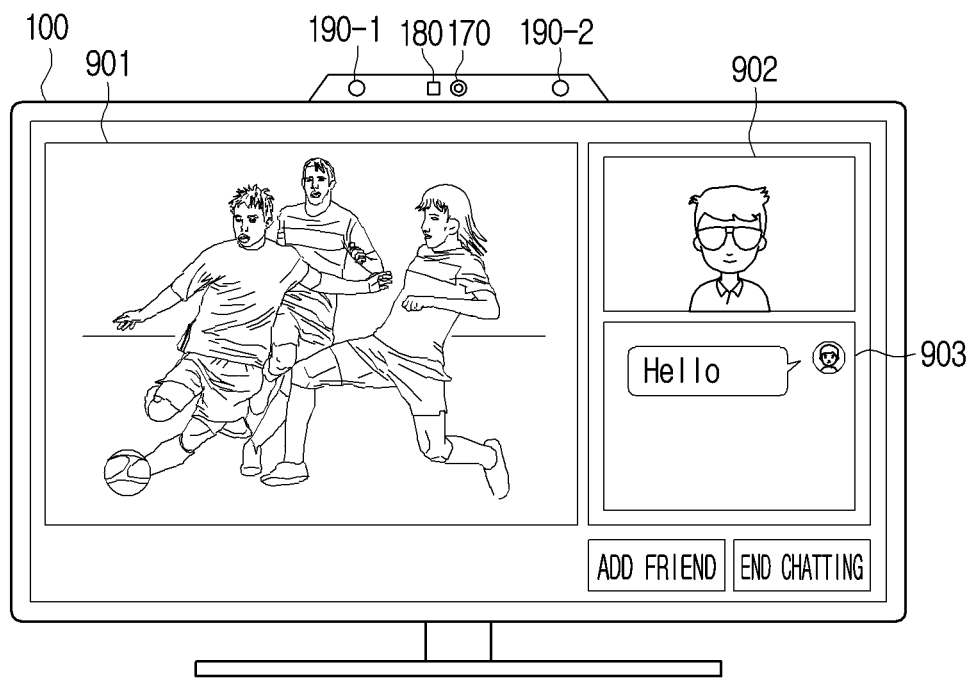
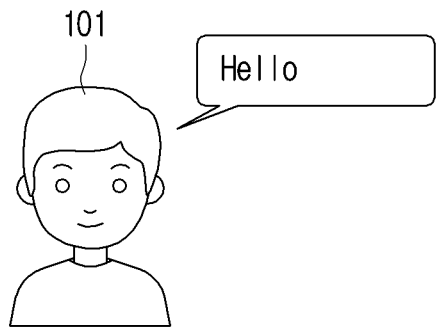

FIG. 11
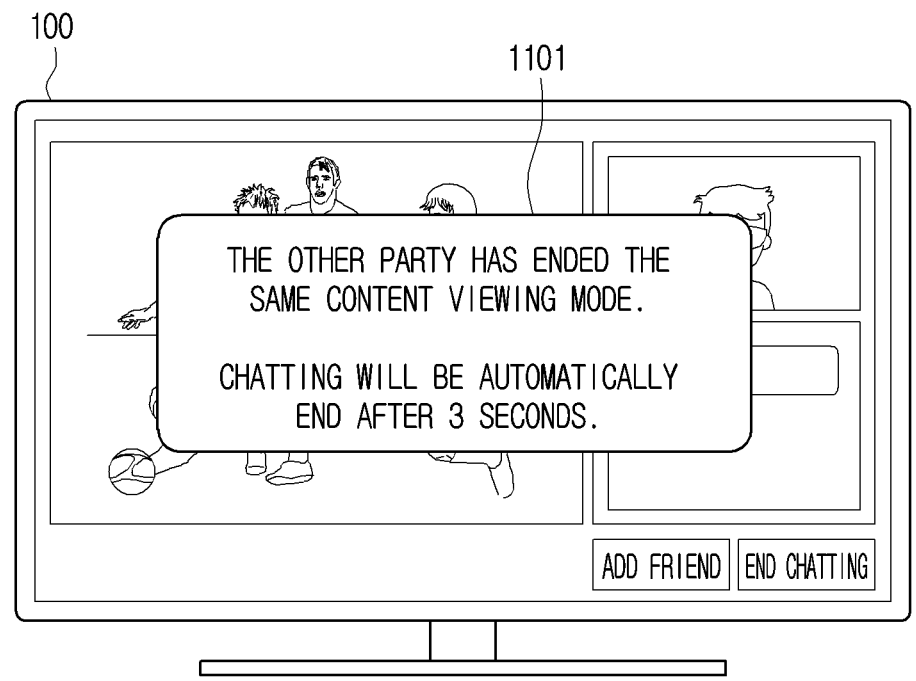
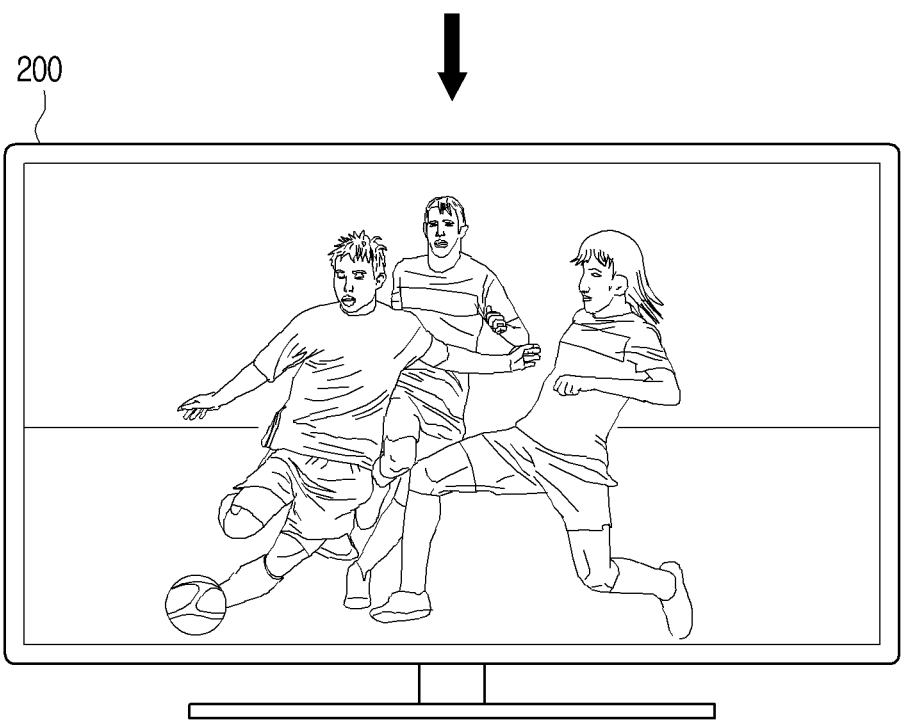

FIG. 14
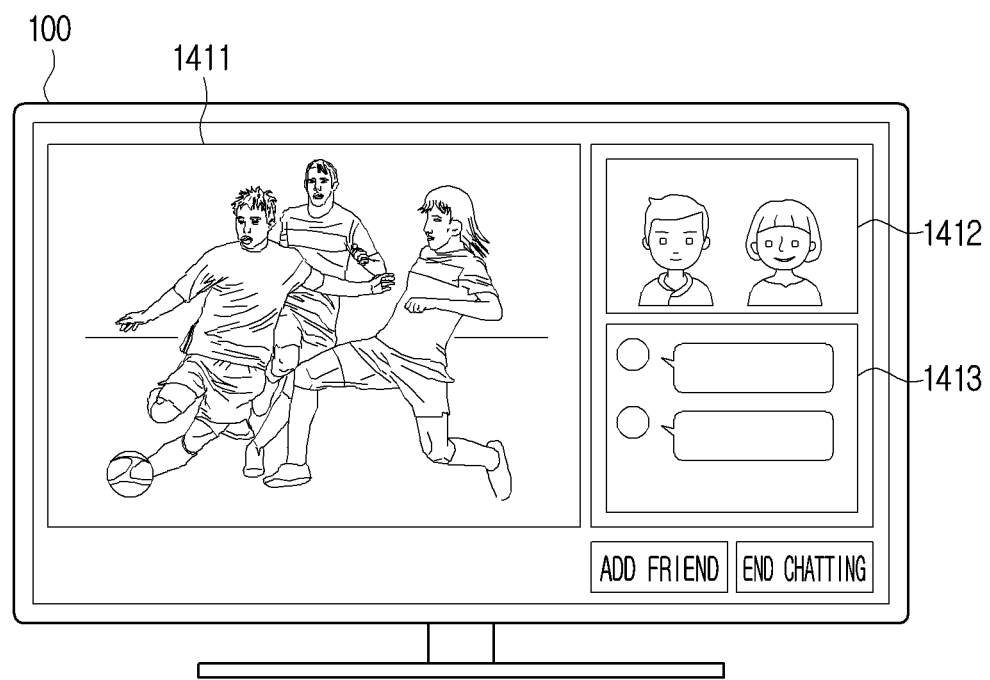
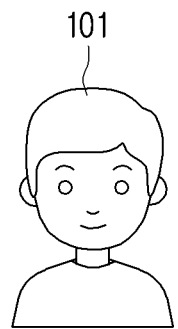

| mapping table | | | | | |
|---|---|---|---|---|---|
| content | type | provider 01 | provider 02 | provider 03 | ID |
| 24 SPORTS | broadcast | ch 10 | ch20 | X | #b001 |
| 24 COOK | broadcast | ch 11 | ch22 | X | #b002 |
| 24 NEWS | broadcast | ch 12 | X | X | #b003 |
| MOVIE 'A' | VOD | 0 | X | 0 | #v001 |

ELECTRONIC APPARATUS AND CONTROL METHOD THEREOF

CROSS-REFERENCE TO RELATED APPLICATION(S)

This application is a continuation application, under 35 U.S.C. § 111(a), of international application No. PCT/KR2021/011670, filed on Aug. 31, 2021, which claims priority under 35 U. S. C. § 119 to Korean Patent Application No. 10-2020-0133007, filed on Oct. 14, 2020, the disclosures of which are incorporated herein by reference in their entirety

BACKGROUND

Field

The disclosure relates to an electronic apparatus and a control method thereof, and more particularly, to an electronic apparatus for providing a service allowing different users to view the same content and a control method thereof.

Description of Related Art

A plurality of users may chat with one another while viewing content in a streaming manner by accessing one website address. For example, a plurality of users may view a sports game while chatting with one another by accessing an Internet address at which the sports game is broadcast in real time.

There may be a method of viewing certain content by accessing an address generated by a website. Here, the content may be determined directly by a manager of the website or determining directly by an individual as in personal broadcasting. According to the above-described methods, a plurality of users may chat with one another online while viewing the same content.

However, in the above-described methods, a plurality of users should access the same Internet address to view the same content. Therefore, a server may be down or a video may not be smoothly viewed when many users access the same Internet address at the same time.

TV-radio frequency (RF), TV-set-top box (STB), and an over-the-top (OTT) streaming method are merely manual settings, because users have to contact each other and input a command by themselves to view the same content.

In addition, in TV-RF and TV-STB, channel numbers of service providers are different from each other and thus a plurality of users who receive content from different service providers may feel difficulties viewing the same content. For example, a channel number of a sports channel provided by a first service provider may be 10 and a channel number of a sports channel provided by a second service provider may be 20. Even when a user using the first service provider tells a user using the second service provider to tune in to a sports channel, the user using the second service provider should know that the channel number of the sports channel is 20 to view the sports channel.

In addition, in the OTT streaming method, a content address and format of each of service providers are different from those of the others and thus a plurality of users who receive content from different service providers will feel difficulties viewing the same content. This problem occurs because the name of content may slightly different and a UI may be different for each service provider.

Therefore, it is necessary for different users to accurately know a channel number at which content is provided or a location of a video-on demand (VOD) to view the same content. However, some users would experience inconvenience in searching for the channel number or the location of the VOD corresponding to certain content by themselves when they do not know the channel number or VOD location.

SUMMARY

According to an embodiment of the disclosure, an electronic apparatus includes a display, a communication interface, a memory to store first user information of a first user corresponding to the electronic apparatus and information of a plurality of other users, and a processor configured to control the display to display recommended content determined based on the first user information. The processor is configured to, in response to a content being selected from among the recommended content displayed on the display, control the display to display identification information corresponding to at least one other user, among the plurality of other users, to whom the content selected is displayable based on a respective information of the at least one other user stored among the information of plurality of other users, and in response to identification information corresponding to a second user being selected from among the displayed identification information corresponding to the at least one other user control the communication interface to transmit a request signal to an external terminal device corresponding to the second user so that the content selected is displayable on the external terminal device of the second user.

Each of the first user information and the information of the plurality of other users may include history information and service provider information. The service provider information may include at least one of service provider identification information, service provider control command information, content identification information, or content detail information, and the processor may be further configured to identify a plurality of pieces of preferred content based on the history information of the first user, identify, as the recommended content, content to be viewable at a current point in time among the identified plurality of pieces of preferred content on the based the service provider information of the first user, and obtain identification information corresponding to the at least one other user to whom the content selected is displayable based on the service provider information of the plurality of other users.

The processor may be further configured to control the display to display the content selected on a first area of the display in response to a response signal being received from the external terminal device of the second user through the communication interface, and control the display to display a captured image of the second user on a second area of the display in response to the captured image of the second user being received through the communication interface.

In response to text information input by the second user being received from the external terminal device of the second user through the communication interface, the processor may be further configured to control the display to display the received text information on a third area of the display.

In response to the response signal being received from the external terminal device of the second user through the communication interface, the processor may be further configured to change a screen size of the content selected to correspond to a size of the first area and control the display to display the content selected on the first area based on the changed screen size.

The electronic apparatus may further include a camera, in which the processor may be further configured to obtain a captured image of the first user through the camera in response to a response signal being received from the external terminal device of the second user through the communication interface, and control the communication interface to transmit the obtained captured image of the first user to the external terminal device of the second user.

The information of the plurality of other users may include history information and service provider information of the plurality of other users, where the processor may be further configured to identify preference for the content selected based on the history information of the plurality of other users, and control the display to display identification information corresponding to at least one other user with the preference for the content selected to whom the content selected is displayable among at least one other user with preference for the content selected based on the service provider information of the plurality of other users.

The memory may store mapping information in which the service provider information of the first user and the service provider information of the plurality of other users are mapped to each other, in which the processor may be further configured to transmit, to the external terminal device of the second user, identification information corresponding to the content selected and a request signal to display the content selected on the external terminal device of the second user based on the mapping information.

The processor may be further configured to control the display to display a notification message based on a reserved event, and control the communication interface to transmit, to the external terminal device of the second user, a request signal to display content corresponding to the reserved event on the external terminal device of the second user, in response to a user input corresponding to the displayed notification message being received.

The processor may be further configured to receive data related to the plurality of other users from an external server through the communication interface, and update the information of the plurality of other users is based on the received data.

According to another embodiment of the disclosure, a control method of an electronic apparatus, the method including storing first user information of a first user and information of a plurality of other users, displaying recommended content determined based on the first user information, in response to a content being selected from among the displayed recommended content, displaying identification information corresponding to at least one other user, among the plurality of other users, to whom the content selected dis displayable based on a respective information of the at least one other user stored among the information of plurality of other users, and in response to identification information corresponding to a second user being selected from among the displayed identification information corresponding to the at least one other user, transmitting a request signal to an external terminal device corresponding to the second user so that the content selected is displayable on the external terminal device of the second user.

The first user information and the information of the plurality of other users may include history information and service provider information. The service provider information may include at least one of service provider identification information, service provider control command information, content identification information, or content detail information, the displaying of the recommended content may include identifying a plurality of pieces of preferred content based on history information of the first user, and identifying, as the recommended content, content to be viewable at a current point in time among the identified plurality of pieces of preferred content based on the service provider information of the first user, and the displaying of the identification information corresponding to the at least one other user may include obtaining identification information corresponding to the at least one other user to whom the content selected is displayable based on the service provider information of the plurality of other users.

The control method may further include displaying the content selected on a first area of the display of the electronic apparatus in response to a response signal being received from the external terminal device of the second user, and in response to a captured image of the second user being received, displaying the received captured image of the second user on a second area of the display.

The control method may further include displaying text information on a third area of the display in response to text information input by the second user being received from the external terminal device of the second user through the communication interface.

The displaying of the content selected on the first area of the display of the electronic apparatus may include changing a screen size of the content selected to correspond to a size of the first area and displaying the content selected on the first area based on the changed screen size, in response to a response signal being received from the external terminal device of the second user.

The control method may further include obtaining a captured image of the first user and transmitting the captured image of the first user to the external terminal device of the second user, in response to a response signal is received from the external terminal device of the second user.

The information of the plurality of other users may include history information and service provider information of the plurality of other users, and the displaying of the identification information corresponding to the at least one other user may include identifying preference for the content selected based on the history information of the plurality of other users, and displaying identification information corresponding to at least one other user with the preference for the content selected to whom the content selected is displayable among at least one other user with preference for the content selected, based on the service provider information of the plurality of other users.

The transmitting of the request signal to the external terminal device of the second user may include transmitting a request signal to display identification information corresponding to the content selected and the content selected on the external terminal device of the second user to the external terminal device of the second user based on mapping information mapping the service provider information of the first user and the service provider information of the plurality of other users to each other.

The control method may further include displaying a notification message based on a reserved event, and transmitting to the external terminal device a request signal to display content corresponding to the reserved event on the external terminal device of the second user in response to a user input corresponding to the displayed notification message being received.

The control method may further include receiving data related to the plurality of other users from an external server and updating the plurality of pieces of other user information on the received data.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a diagram for describing a process of receiving a user's voice from an electronic apparatus and converting it into text data according to an embodiment of the disclosure.

FIG. 11 is a diagram for describing ending the same content viewing mode according to an embodiment of the disclosure.

FIG. 14 is a diagram for describing using the same content viewing mode with at least three users according to an embodiment of the disclosure.

FIG. 26 is a table for describing mapping information mapping content and each service provider to each other according to an embodiment of the disclosure.

DETAILED DESCRIPTION

Figure 1:
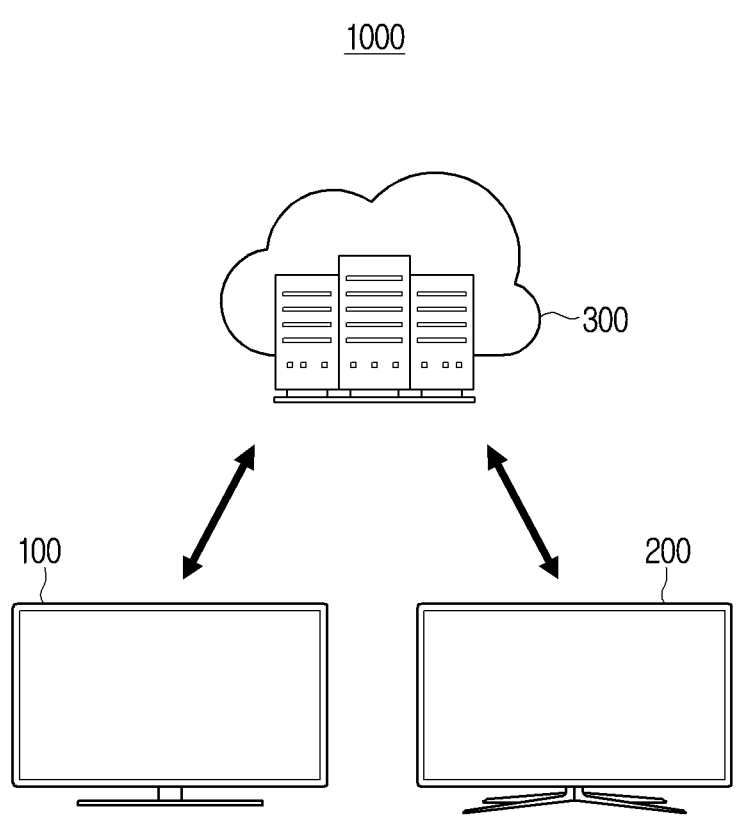
FIG. 1 is a diagram for describing a system according to an embodiment of the disclosure.

Hereinafter, the disclosure will be described in detail with reference to the accompanying drawings.

In embodiments of the disclosure, general terms that have been widely used nowadays are selected, if possible, in consideration of functions of the disclosure, but non-general terms may be selected according to the intentions of technicians in the art, precedents, or new technologies, etc. Some terms may be arbitrarily chosen by the present applicant, and in this case, the meanings of these terms will be explained in corresponding parts of the disclosure in detail. Accordingly, the terms used herein should be defined not based on the names thereof but based on the meanings thereof and the whole context of the disclosure.

As used herein, expressions such as "have", "may have," "include" or "may include" are intended to indicate the presence of features (e.g., a numerical value, a function, an operation, a component of a machine part, etc.) and do not exclude the presence of additional features.

It should be understood that the expression "at least one of A and/or B" indicates "A", "B" or one of "A and B".

As used herein, the terms "first," "second," and the like may be used to describe various elements regardless of order and/or importance and distinguish one element from another element, but these elements should not be limited by these terms.

When an element (e.g., a first element) is referred to as being "operatively or communicatively coupled with/to" or "connected to" another element (e.g., a second element), the element should be understood as being directly connected to the other element or connected to the other element via another element (e.g., a third element).

As used herein, the singular expressions are intended to include plural forms as well, unless the context clearly dictates otherwise. It will further be understood that the terms "comprise" and/or "comprising", when used herein, specify the presence of stated features, integers, steps, operations, elements, components, or a combination thereof, but do not preclude the presence or addition of one or more features, integers, steps, operations, elements, components, or a combination thereof.

In the disclosure, the term "module" or "unit" may refer to an element performing at least one function or operation, and may be embodied as hardware, software, or a combination thereof. A plurality of "modules" or a plurality of "units" may be integrated into at least one module to form at least one processor (not shown), except a "module" or "unit" which need be embodied as particular hardware.

As used herein, the term "user" may refer to a person or a device (e.g., an artificial intelligence electronic device) capable of using an electronic apparatus.

An embodiment of the disclosure will now be described in more detail with reference to the accompanying drawings.

To address the above-described problem, the disclosure is directed to providing an electronic apparatus for providing the same content viewing service to a user and other users with respect to content selected by the user, and a control method thereof.

FIG. 1 is a diagram for describing a system according to an embodiment of the disclosure.

Referring to FIG. 1, a system 1000 may include an electronic apparatus 100, an external terminal device 200, and an external server 300.

The system 1000 may include a plurality of devices for performing the same content viewing mode.

The electronic apparatus 100 may be an apparatus that requests the same content viewing mode. The electronic apparatus 100 may generate a request signal to perform the same content viewing mode for content selected by a user of the electronic apparatus 100 (hereinafter referred to as a first user). In addition, the electronic apparatus 100 may transmit the generated request signal to the external server 300.

The external terminal device 200 may receive the request signal generated by the electronic apparatus 100 from the external server 300. A user of the external terminal device 200 (hereinafter referred to as a second user) may generate a response signal to accept the same content viewing mode. The external terminal device 200 may transmit the generated response signal to the external server 300.

The external server 300 may be understood as a device that transmits information to the electronic apparatus 100 and the external terminal device 200 in performing the same content viewing mode. Specifically, the external server 300 may transmit the request signal received from the electronic apparatus 100 to the external terminal device 200, and transmit the response signal received from the external terminal device 200 to the electronic apparatus 100.

Here, the electronic apparatus 100 and the external terminal device 200 may be understood as various types of devices capable of providing content to a user.

Figure 2:
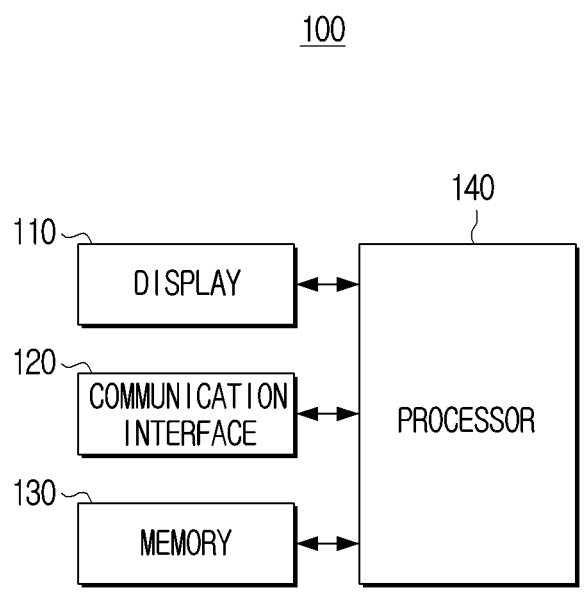
FIG. 2 is a block diagram of an electronic apparatus according to an embodiment of the disclosure.

FIG. 2 is a block diagram of an electronic apparatus according to an embodiment of the disclosure.

Referring to FIG. 2, an electronic apparatus 100 may include a display 110, a communication interface 120, a memory 130, and a processor 140.

The electronic apparatus 100 may include various types of devices, including a display. The electronic apparatus 100 may be an electronic blackboard, a TV, a desktop PC, a laptop computer, a smart phone, a tablet PC, a server, or the like. The above-described examples are only for describing an electronic apparatus, and embodiments are not necessarily limited thereto.

The display 110 may be embodied as various types of displays such as a liquid crystal display (LCD), an organic light-emitting diode (OLED) display, and a plasma display panel (PDP). A driving circuit, a backlight unit, etc., which are in the form of a a-silicon thin-film transistor (TFT), a low-temperature polysilicon (LTPS) TFT, or an organic TFT (OTFT), may be included in the display 110. Meanwhile, the display 110 may be embodied as a touch screen combined with a touch sensor, a flexible display, a three-dimensional (3D) display, or the like.

According to an embodiment of the disclosure, the display 110 may include not only a display panel configured to display an image but also a bezel housing the display panel. In particular, according to an embodiment of the disclosure, the bezel may include a touch sensor (not shown) for sensing a user interaction.

The communication interface 120 is configured to communicate with various types of external devices according to various communication methods. Examples of the communication interface 120 may include a Wi-Fi module, a Bluetooth module, an infrared communication module, a wireless communication module, and the like. Here, each of the communication modules may be in the form of at least one hardware chip.

The Wi-Fi module establishes communication by a WiFi method, and the Bluetooth module establishes communication by a Bluetooth method. When the Wi-Fi module or the Bluetooth module is used, various connection information such as a service set identifier (SSID) and a session key may be transmitted or received to establish communication and transmit or receive various types of information.

The infrared communication module establishes communication by infrared data association (IrDA) for wirelessly transmitting data within a short distance using infrared rays between visual rays and millimeter waves.

The wireless communication module may include at least one communication chip for establishing communication according to various wireless communication standards such as ZigBee, 3rd Generation (3G), 3rd Generation Partnership Project (3GPP), long term evolution (LTE), LTE Advanced (LTE-A), 4th Generation (4G), and 5th Generation (5G), in addition to the communication methods described above.

In addition, the communication interface 120 may include at least one wired communication module for establishing communication using a local area network (LAN) module, an Ethernet module, a pair cable, a coaxial cable, an optical fiber cable, an ultra-wide-band (UWZB) module, or the like.

For example, the communication interface 120 may use the same communication module (e.g., a Wi-Fi module) to communicate with an external device such as a remote control and an external server.

As another example, the communication interface 120 may use different communication modules (e.g., a Wi-Fi module) to communicate with an external device such as a remote control and an external server. For example, the communication interface 120 may use at least one of an Ethernet module or a WiFi module to communicate with an external server, and use a BT module to communicate with an external device such as a remote control. However, the above-described communication modules are only examples, and the communication interface 120 may use at least one of various types of communication modules to communicate with multiple external devices or external servers.

In an embodiment, the electronic apparatus 100 may additionally include a tuner (not shown) and a demodulator (not shown).

The tuner may receive a radio frequency (RF) broadcast signal among RF broadcast signals, which are received through an antenna, by tuning a channel selected by a user or all previously stored channels.

The demodulator may receive and demodulate a digital intermediate frequency (DIF) signal obtained through conversion by the tuner, and perform channel decoding or the like.

The memory 130 may be implemented as an internal memory, such as a read-only memory (ROM) (e.g., electrically erasable programmable ROM (EEPROM)) or a random access memory (RAM), included in the processor 140, or as a memory separate from the processor 140. In this case, the memory 130 may be embodied as a memory embedded in the electronic apparatus 100 or a memory detachably mounted in the electronic apparatus 100 according to a purpose of storing data. For example, data for driving the electronic apparatus 100 may be stored in the memory embedded in the electronic apparatus 100, and data for expanding the electronic apparatus 100 may be stored in the memory detachably mounted in the electronic apparatus 100.

Meanwhile, the memory embedded in the electronic apparatus 100 may be embodied as at least one of a volatile memory (e.g., dynamic RAM (DRAM), static RAM (SRAM), or synchronous dynamic RAM (SDRAM)), a non-volatile memory (e.g., one-time programmable ROM (OTPROM)), programmable ROM (PROM), erasable and programmable ROM (EPROM), EEPROM, mask ROM, flash ROM), flash memory (e.g., NAND flash or NOR flash memory)), a hard drive, or a solid-state drive (SSD), and the memory detachably mounted in the electronic apparatus 100 may be embodied as a memory card (e.g., a compact flash (CF) card, a secure digital (SD) card, a micro-SD card, a mini-SD card, an extreme digital (xD) card, a multi-media card (MMC), etc.), an external memory connectable to a USB port (e.g., USB memory) or the like.

Meanwhile, the memory 130 may store first user information and a plurality of pieces of other user information. The first user information may include history information and service provider information of a first user, and the plurality of pieces of other user information may include history information and service provider information of a plurality of other users. Here, the service provider information may include at least one of service provider identification information, content identification information, or content detail information. In addition, the memory 130 may store mapping information in which the service provider information of the first user and the service provider information of the plurality of other users are mapped to each other.

The processor 140 may control overall operations of the electronic apparatus 100. Specifically, the processor 140 performs a function of controlling the overall operations of the electronic apparatus 100.

The processor 140 may be embodied as a digital signal processor (DSP) configured to process a digital signal, a microprocessor, or a time controller (TCON). However, the processor 140 is not limited thereto, and may include or be referred to as at least one of a central processing unit (CPU), a micro-controller unit (MCU), a micro-processing unit (MPU), a controller, an application processor (AP), a graphics-processing unit (GPU), a communication processor (CP), or an ARM processor. Alternatively, the processor 140 may be embodied as a system-on-chip (SoC) storing a processing algorithm, a large-scale integrated (LSI) circuit, or a field programmable gate array (FPGA). In addition, the processor 140 may execute computer executable instructions stored in the memory to perform various functions.

The processor 140 may control the display 110 to display recommended content determined on the basis of the first user information, control the display 110 to display identification information corresponding to at least one other user who is able to view the selected content on the basis of the plurality of pieces of other user information, when a piece of content is selected from among the recommended content displayed on the display 110, and control the communication interface 120 to transmit a request signal for displaying the selected content on the external terminal device 200 of a second user 201 to the external terminal device 200, when the identification information corresponding to the second user 201 among the displayed identification information is selected.

Here, it is assumed that a user using the electronic apparatus 100 is a first user 101 and a user using the external terminal device 200 is the second user 201.

Here, the processor 140 may identify a plurality of pieces of preferred content of the first user 101 on the basis of the first user information (information related to the first user 101). The processor 140 may determine, as recommended content, content to be provided to the first user 101 among the plurality of pieces of preferred content on the basis of current time information. In addition, the processor 140 may display the determined recommended content on the display 110. There may be a plurality of recommended content according to a subject. Examples of recommended content may include recommended content that may be currently provided, reserved recommended content, recommended content in the field of sports, recommended content in the field of movies, recommended content in the field of dramas, etc. An operation of displaying recommended content will be described with reference to FIG. 5 below.

Here, the processor 140 may receive an input of the first user 101 for selecting one of the plurality of recommended content displayed on the display 110. The processor 140 may identify another user who is able to currently view the content selected by the first user 101 on the basis of the plurality of pieces of other user information. For example, it is assumed that the content selected by the first user 101 is a sports channel that is currently broadcast. The processor 140 may identify a friend who is able to view the currently broadcast sports channel among a list of friends registered by the first user 101. Friends who have subscribed to a service provider that does not provide sports channels cannot view sports channels. Accordingly, the plurality of pieces of other user information may include the list of friends registered by the first user 101 and service provider information subscribed by each of the friends.

Here, the processor 140 may display a list of other users on the display 110. Here, the list of other users may include identification information of other users who can view content selected by the first user 101 at a current time point and identification information of other users who cannot view the selected content.

Here, the processor 140 may display the identification information corresponding to the other users who can currently view the content selected by the first user 101 on the display 110. Here, the identification information corresponding to the other users may be understood as information corresponding to the names or nicknames of the other users. The first user 101 may determine a user to whom the same content viewing mode is to be requested on the basis of the identification information corresponding to the other users. Displaying identification information of other users and displaying whether selected content is to be viewed will be described with reference to FIG. 6 below.

Here, the processor 140 may receive an input for selecting at least one piece of identification information from among the displayed identification information of at least one other user from the first user 101. For example, the first user 101 may select at least one friend in a state in which five friends who can use the same content viewing mode are displayed on the display 110. It is assumed that another user selected by the first user 101 is the second user 201. When the identification information corresponding to the second user 201 is selected by the first user 101, the processor 140 may generate a request signal for the same content viewing mode. The request signal may include control command information for controlling the external terminal device 200. Here, the control command information may include code for changing content provided by the external terminal device 200 (changing a broadcast channel) or newly executing the content (running a video on demand (VOD)). The external terminal device 200 may display content on a display of the external terminal device 200 on the basis of code received from the electronic apparatus 100 without a separate input from the second user 201.

Here, the processor 140 may transmit the generated request signal to the external terminal device 200 of the second user 201 through the external server 300. An operation performed after transmitting the request signal will be described with reference to FIG. 7 below.

Meanwhile, each of the first user information and the plurality of pieces of other user information may include history information and service provider information, the service provider information may include at least one of service provider identification information, service provider control command information, content identification information, or content detail information, and the processor 140 may identify a plurality of pieces of preferred content on the basis of the history information of the first user, identify, as recommended content, content to be viewed at a current point in time (or content to be provided to the electronic apparatus 100 at the current point in time) among the identified pieces of preferred content on the basis of the service provider information of the first user 101, and obtain identification information corresponding to at least one other user who can view the selected content on the basis of the service provider information of the plurality of other users.

Here, the history information may include information indicating content used by a user and the number of times of using the content. Accordingly, the electronic apparatus 100 may identify the user's preferred content on the basis of the history information. In addition, the electronic apparatus 100 may determine the identified preferred content as recommended content.

Here, the service provider information may be understood as information related to a company providing content to a device of the user. A type of content to be supplied to the user may vary according to a service provider to be used. For example, the service provider information may be metadata related to a service provider that provides content, and the metadata may include information about an electronic program guide (EPG) and a VOD of the service provider. Accordingly, the electronic apparatus 100 may store metadata of each of a plurality of service providers in the memory 130 and periodically update the metadata.

Here, the service provider identification information may be unique information of a service provider. Identification information of a first service provider may be different from that of a second service provider.

Here, the service provider control command information may include various control commands to request a service provider to provide content. For example, the service provider control command information may include a content execution command. The content execution command may include code information necessary for a channel change command or a VOD execution command. The content execution command may be included in a request signal generated by the electronic apparatus 100, and the external terminal device 200 may receive code information corresponding to the content execution command through the electronic apparatus 100. When the second user 201 receives an input accepting the same content viewing mode, the external terminal device 200 may execute content (change channels or run a VOD) on the basis of the code information corresponding to the content execution command. According to an embodiment, a multi-brand remote (MBR) function may be used to control various types of devices using different service providers.

Here, the content identification information may be unique information of content. Identification information of first content may be different from that of second content.

Here, the content detail information may be various types of information related to content. The content detail information may include at least one of content name, content category, a content providing time, a content playback time, or content summary information.

The processor 140 may identify a plurality of pieces of preferred content that are expected to be viewed frequently by the first user 101 on the basis of the history information of the first user 101. The processor 140 may determine whether preferred content of the first user 101 is to be displayed on the display 110. The processor 140 may identify whether preferred content is provided at a current time point, based on the service provider information of the first user 101. The processor 140 may identify content to be displayed on the display 110 at the current time point among a plurality of pieces of preferred content on the basis of the service provider information of the first user 101, and determine the identified content as recommended content.

The processor 140 may control the display 110 to display selected content on a first area 801 of the display 110 when a response signal is received from the external terminal device 200 of the second user 201 through the communication interface 120, and control the display 110 to display a received captured image of the second user 201 on a second area 802 of the display 110 when the captured image of the second user 201 is received through the communication interface 120.

Here, the response signal may be a signal indicating that a request for the same content viewing mode, which is transmitted from the electronic apparatus 100, is accepted by the second user 201. When it is identified that the second user 201 has accepted the request for the same content viewing mode from the first user 101, the external terminal device 200 may generate a response signal and transmit the response signal to the electronic apparatus 100. When the response signal is received, the processor 140 may display selected content on the first area 801 of the display 110.

According to an embodiment, the processor 140 may display content selected prior to the receipt of the response signal on the first area 801 of the display 110.

Here, the processor 140 may perform a video chat function for the first user 101 and the second user 201. The processor 140 may receive a captured image of the second user 201 from the external terminal device 200 and display the received captured image of the second user 201 on the second area 802 of the display 110.

Meanwhile, when text information input by the second user 201 is received from the external terminal device 200 of the second user 201 through the communication interface 120, the processor 140 may control the display 110 to display the received text information on a third area 803 of the display 110.

Displaying content, a captured image, and text on each area of the display 110 will be described in detail with reference to FIG. 8 below.

Meanwhile, when a response signal is received from the external terminal device 200 of the second user 201 through the communication interface 120, the processor 140 may change a screen size of selected content to correspond to the size of the first area 801, and control the display 110 to display the selected content on the first area 801 on the basis of the changed screen size.

Here, the first area 801 may be a part of an entire area of the display 110. In general, content is displayed on the entire area of the display 110 and thus the processor 140 may display content by changing the size of the content. The size of the first area 801 may be a predetermined size, and the processor 140 may change the size of the selected content to the size of the first area 801. In addition, the processor 140 may display the selected content on the first area 801 on the basis of the changed size.

The electronic apparatus 100 may further include a camera 170, and the processor 140 may obtain a captured image of the first user 101 through the camera 170 when a response signal is received from the external terminal device 200 of the second user 120 through the communication interface 120, and control the communication interface 120 to transmit the obtained captured image to the external terminal device 200 of the second user 201.

Here, when it is identified that the second user 201 has accepted the request for the same content viewing mode, the processor 140 may perform the video chat function. Specifically, the electronic apparatus 100 may display a face image of the second user 201, and the external terminal device 200 may display a face image of the first user 101.

An operation related to a video chat will be described with reference to FIGS. 8, 17, and 18 below.

Meanwhile, the plurality of pieces of other user information may include history information and service provider information of a plurality of other users, and the processor 140 may identify at least one other user who prefers selected content on the basis of the history information of the plurality of other users, and control the display 110 to display identification information corresponding to at least one other user who can view the selected content among the at least one other user who prefers the selected content on the basis of the service provider information of the plurality of other users.

Here, the recommended content described above may be content that reflects a preference of the first user 101. However, not only the preference of the first user 101 but also a preference of the other party may be important for the same content viewing mode. This is because the same content viewing mode is a service used by a plurality of users who prefer all the same content.

Here, the processor 140 may identify another user who prefers the selected content among the plurality of other users identified on the basis of the history information of the plurality of other users. In addition, the processor 140 may identify another user who can view the selected content among other users who prefer the selected content, based on the service provider information of the plurality of other users.

Here, first, the processor 140 may identify other users who prefer the selected content on the basis of the history information. This is because determining whether other users prefer the selected content requires low data throughput and thus a processing speed is high.

For example, the processor 140 may identify that ten friends among one hundred of friends prefer a sports channel (selected content) on the basis of history information of a plurality of friends. The processor 140 may identify that two friends among the ten friends may currently view a sports channel. In addition, the processor 140 may display identification information corresponding to the two friends on the display 110. The first user 101 may consider which one of the two friends with whom the first user 101 will use the same content viewing mode, based on the displayed identification information corresponding to the two friends.

Meanwhile, the processor 140 may store, in the memory 130, mapping information mapping the service provider information of the first user 101 to the service provider information of the plurality of other users, and the processor 140 may transmit a request signal for displaying identification information corresponding to content selected based on the mapping information and content selected by the external terminal device 200 of the second user 201 to the external terminal device 200 of the second user 201.

Here, a method of providing certain content may vary according to a service provider. For example, when the content is a broadcast channel, a channel number may vary according to a service provider. As another example, when the content is a VOD, the name of the VOD or a VOD selection UI may vary according to a service provider. Thus, unique identification information may be required for the content regardless of a service provider. The unique identification information may be a hash tag or a predetermined unique key. The mapping information may include information indicating a relationship between identification information corresponding to certain content and a plurality of service providers. An operation related to the mapping information will be described with reference to FIG. 26 below.

Meanwhile, the processor 140 may control the display 110 to display a notification message on the basis of a reserved event, and control the communication interface 120 to transmit a request signal for displaying content corresponding to the reserved event on the external terminal device 200 of the second user 201 to the external terminal device 200 of the second user 201 when a user input corresponding to the displayed notification message is received.

Here, it is assumed that the first user 101 and the second user 201 have promised to simultaneously view content to be broadcast at a certain time point. For example, the first user 101 and the second user 201 may promise to use the same content viewing mode for a soccer game starting at 3 p.m.

Here, the first user 101 may reserve in advance to use the same content viewing mode at 3 p.m. through the electronic apparatus 100, together with the second user 201. The processor 140 may store a reservation command from the first user 101 in the memory 130, and display a notification message on the display 110 at reservation time included in the reservation command. In addition, the processor 140 may transmit a request signal for the same content viewing mode to the external terminal device 200 of the second user 201 at the reservation time.

Meanwhile, the processor 140 may receive data related to a plurality of other users from the external server 300 through the communication interface 120, and update a plurality of pieces of other user information on the basis of the received data.

Here, the data related to the plurality of other users may include recent history information or recent service provider information of the plurality of other users. In addition, the processor 140 may receive the data related to the plurality of other users through the external server 300. Although the expression "data related to the plurality of other users" is used to avoid confusion with the plurality of pieces of other user information stored in the memory 130, the data related to the plurality of other users may be also understood as the plurality of pieces of other user information. The processor 140 may update the plurality of pieces of other user information according to a preset period.

Unlike Internet broadcasting in which multiple users access one Internet address to view content, multiple users can receive content by using their own service provider servers according to the disclosure. Therefore, the same content viewing mode of the disclosure may prevent an excess of traffic or prevent a server from being down.

In addition, according to the application, a control command may be automatically transmitted to the other party by using the mapping information. Accordingly, the other party may use the same content viewing mode without a separate control command. Therefore, user convenience may be improved.

Although only a simple configuration of the electronic apparatus 100 is illustrated and described above, various other components may be additionally provided according to an embodiment. This embodiment will be described with reference to FIG. 3 below.

Figure 3:
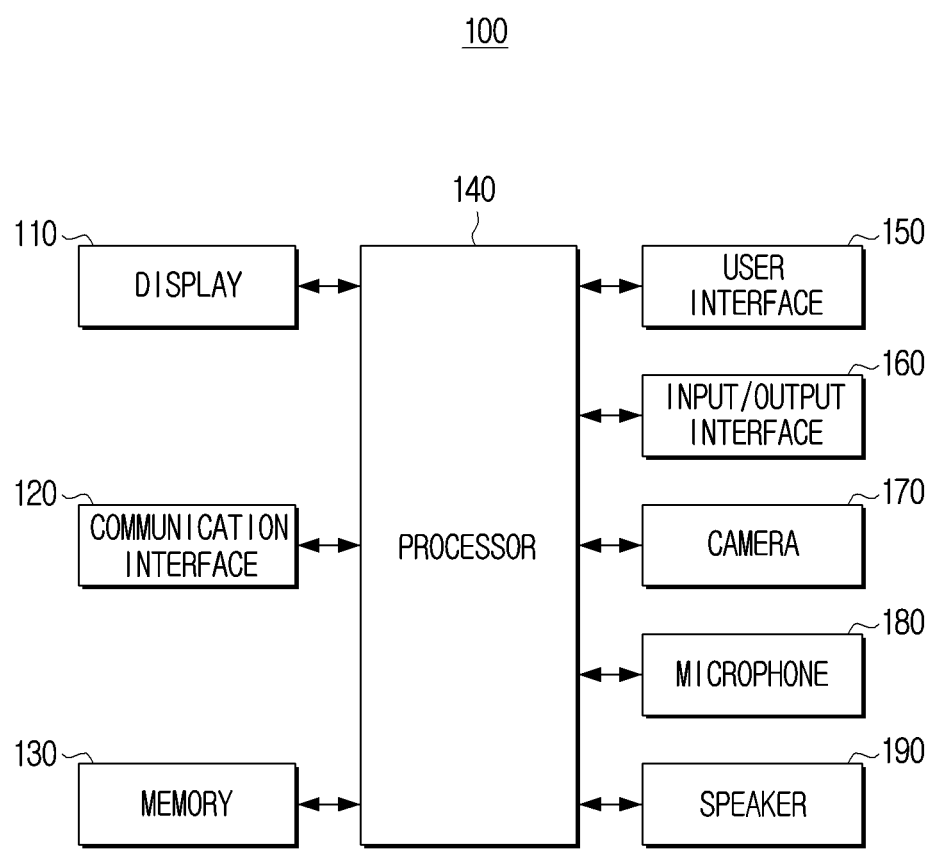
FIG. 3 is a detailed block diagram for describing a configuration of the electronic apparatus of FIG. 2 according to an embodiment of the disclosure.

FIG. 3 is a detailed block diagram for describing a configuration of the electronic apparatus of FIG. 2.

Referring to FIG. 3, the electronic apparatus 100 may include a display 110, a communication interface 120, a memory 130, a processor 140, a user interface 150, an input/output interface 160, a camera 170, a microphone 180, and a speaker 190.

Operations of the display 110, the communication interface 120, the memory 130, and the processor 140 that are the same as those described above will not be redundantly describe here.

The user interface 150 may be embodied as a device such as a button, a touch pad, a mouse, or a keyboard or as a touch screen for performing both a display function and a manipulation input function as described above. Here, the button may include various types of buttons, such as mechanical buttons, a touch pad, and wheels, which are provided on a certain region such as a front part, a side part, and a rear part of the exterior of the main body of the electronic apparatus 100.

The input/output interface 160 may be a high-definition multimedia interface (HDMI), mobile high-definition link (MHL), universal serial bus (USB), a display port (DP), thunderbolt, a video graphics array (VGA) port, an RGB port, D-subminiature (D-SUB), or digital visual interface (DVI).

At least one of an audio signal or a video signal may be input to or output from the input/output interface 160.

In an embodiment, the input/output interface 160 may include a port for inputting or outputting only audio signals and a port for inputting or outputting only video signals as separate ports or may be implemented as one port for inputting or outputting both audio and video signals.

The camera 170 is configured to capture an image of a subject to generate the captured image, and the captured image is a concept including both a moving image and a still image. The camera 170 may obtain an image of at least one external device and be implemented as a camera, a lens, an infrared sensor, or the like.

The camera 170 may include a lens and an image sensor. A type of the lens may be a general-purpose lens, a wide-angle lens, a zoom lens, or the like, and may be determined according to the type, features, and use environment of the electronic apparatus 100. A complementary metal oxide semiconductor (CMOS), a charge-coupled device (CCD) or the like may be used as the image sensor.

The camera 170 outputs light incident thereon in the form of an image signal. Specifically, the camera 170 may include a lens, pixels, and an analog-to-digital (AD) converter. The lens collects light from the subject and an forms an optical image on an imaging area, and the pixels may output light incident on the lens in the form of an analog image signal. The AD converter may convert an analog image signal into a digital image signal and output the digital image signal. In particular, the camera 170 may be arranged to perform photographing in a direction toward a front surface of the electronic apparatus 100 and thus may capture and obtain an image of a user located in front of the electronic apparatus 100.

The electronic apparatus 100 may further include a microphone 180. The microphone 180 is a component configured to receive a user's voice or another type of sound and convert the user's voice or the other type of sound into audio data.

The microphone 180 may receive a user's voice in an activated state. For example, the microphone 180 may be integrally formed with an upper, front, or lateral side of the electronic apparatus 100. The microphone 180 may include various types of components, such as a microphone for collecting a user's voice in an analog form, an amplifier circuit for amplifying the collected user's voice, an A/D conversion circuit for sampling the amplified user's voice and converts a result of the sampling into a digital signal, and a filter circuit for removing noise components from the digital signal.

The electronic apparatus 100 may include the speaker 190. The speaker 190 may be a component configured to output not only various types of audio data processed by the input/output interface 170 but also various types of notification sound or voice messages.

Figure 4:
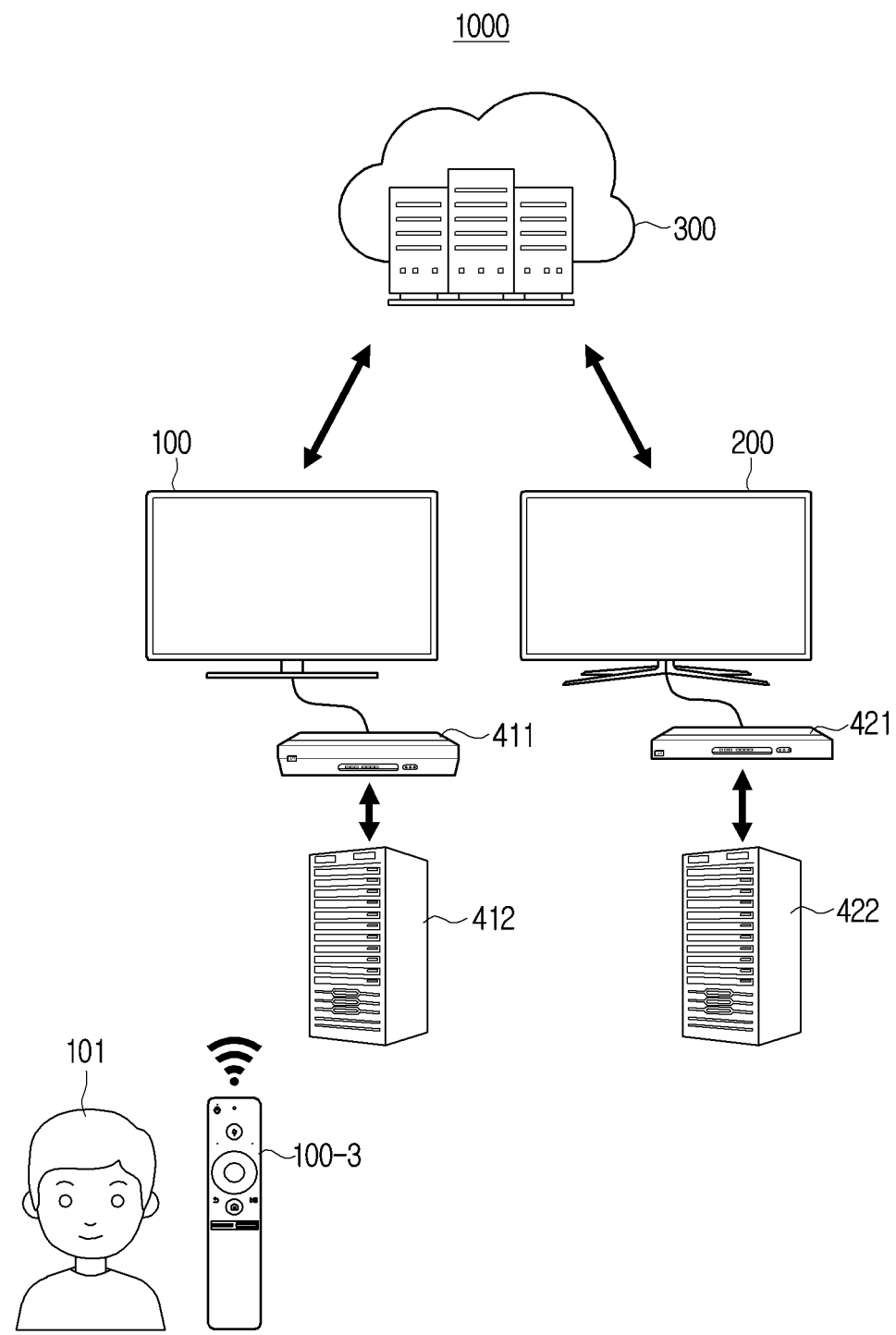
FIG. 4 is a diagram for describing controlling an electronic apparatus and an external terminal device through a remote control device according to an embodiment of the disclosure.

FIG. 4 is a diagram for describing controlling an electronic apparatus and an external terminal device through a remote control device.

Referring to FIG. 4, a system 1000 may include an electronic apparatus 100, an external terminal device 200, and an external server 300.

It is assumed that the electronic apparatus 100 receives content from a first service provider and the external terminal device 200 receives content from a second service provider.

The electronic apparatus 100 may be connected to a first set-top box (STB) device 411 that provides content to the electronic apparatus 100. The first STB device 411 may receive content from a first service provider server 412 and transmit the received content to the electronic apparatus 100. The first STB device 411 may be a device provided by the first service provider.

Here, the external terminal device 200 may be connected to a second STB device 421 that provides content to the external terminal device 200. The second STB device 421 may receive content from a second service provider server 422 and transmit the received content to the external terminal device 200. The second STB device 421 may be a device provided by the second service provider.

Here, the electronic apparatus 100 may be controlled by a remote control device 100-3. A first user 101 may control the electronic apparatus 100 through the remote control device 100-3 and transmit a control signal to the external server 300. The external server 300 may transmit the received control signal to the external terminal device 200.

Specifically, when a command requesting the same content viewing mode is received from the first user 101, the electronic apparatus 100 may generate a request signal and transmit the request signal to the external server 300. The external server 300 may transmit the request signal to the external terminal device 200.

Here, when an input accepting the same content viewing mode is received from a second user who uses the external terminal device 200, the external terminal device 200 may generate a response signal and transmit the response signal to the external server 300. The external server 300 may transmit the response signal to the electronic apparatus 100.

Meanwhile, when it is determined that the same content viewing mode is to be performed in the electronic apparatus 100 and the external terminal device 200, the electronic apparatus 100 may receive content from the first service provider server 412 by using the first STB device 411, and the external terminal device 200 may receive content from the second service provider server 422 by using the second STB device 421.

Figure 5:
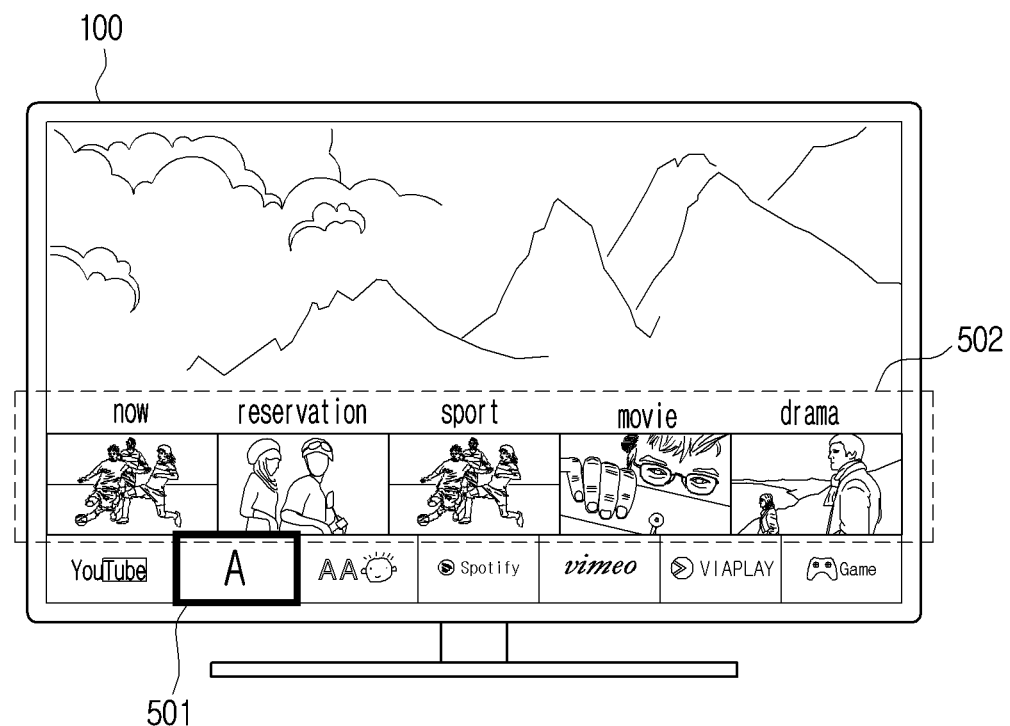
FIG. 5 is a diagram for describing displaying recommended content for the same content viewing mode according to an embodiment of the disclosure.

FIG. 5 is a diagram for describing displaying recommended content for the same content viewing mode.

Referring to FIG. 5, a home screen of an electronic apparatus 100 may include a plurality of applications. One of the plurality of applications may be an application 501 that performs the same content viewing mode.

When the application 501 that performs the same content viewing mode is selected by a user, the electronic apparatus 100 may display recommended content for each category. Examples of recommended content may include at least one of content that may be provided currently, reserved content, sports content, movie content, or drama content. Recommended content may include recommended content corresponding to each of at least one of various types of content as described above. For example, the electronic apparatus 100 may identify, as recommended content, content for which a user has a most preference among pieces of content that can be provided currently. Thus, recommended content of each of categories (now, reservation, sports, movie, drama, etc.) may be displayed.

Here, the recommended content may be identified on the basis of history information of a user. The electronic apparatus 100 may store history information reflecting the user's preference. The electronic apparatus 100 may identify the user's preferred content and display preferred content identified for each category as recommended content.

Here, the electronic apparatus 100 may display a thumbnail image of the recommended content.

Figure 6:
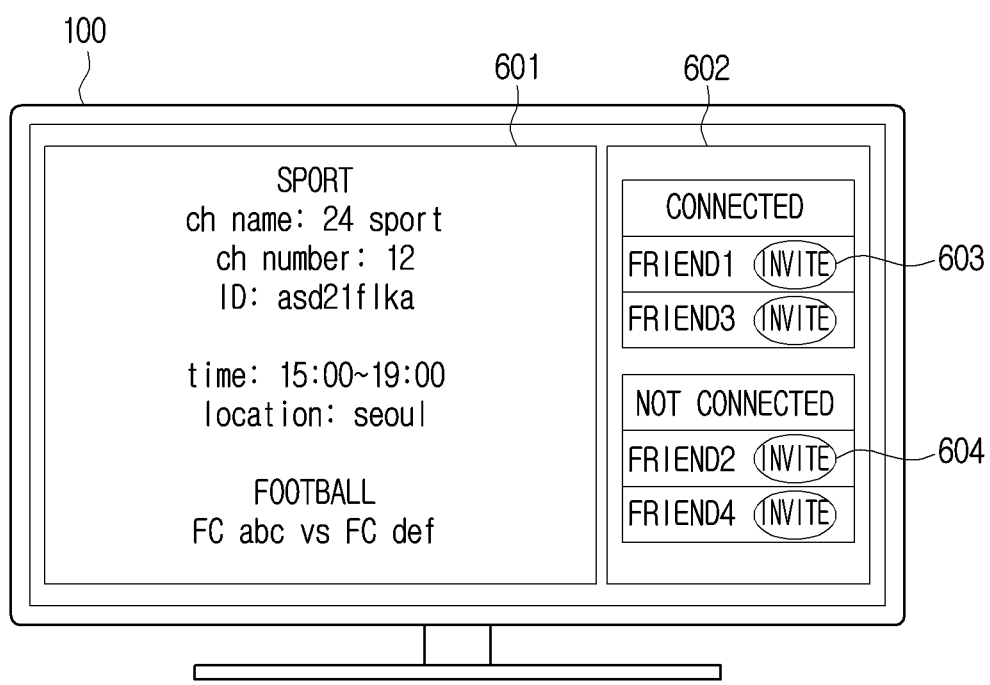
FIG. 6 is a diagram for describing a user interface (UI) indicating whether a user registered in the same content viewing mode is online according to an embodiment of the disclosure.

FIG. 6 is a diagram for describing a user interface (UI) indicating whether a registered user is connected in the same content viewing mode.

Referring to FIG. 6, it is assumed that a first user selects a piece of content from among a plurality of recommended content. Here, the electronic apparatus 100 may display information corresponding to the selected content on a first area 601 of a display 110. Here, the information corresponding to the selected content may include at least one of a channel name, a channel number, identification information, time, or content additional information. Here, the content additional information may be information related to the content. When it is assumed that the selected content is a sports channel as in the embodiment of FIG. 6, the content additional information may be information related to a sports game (time, place, type, and target of the game).

The electronic apparatus 100 may display a list of other users on a second area 602 of the display 110. The list of other users may include a plurality of other users previously registered by the first user of the electronic apparatus 100. Here, the electronic apparatus 100 may display the list of other users to differentiate between other users who are online and other users who are offline. In the embodiment of FIG. 6, a friend 1 and a friend 3 may be currently viewing TV, and a friend 2 and a friend 4 may not be currently viewing TV.

Here, the electronic apparatus 100 may display invitation UIs 603 and 604 corresponding to other users included in the list of other users.

According to an embodiment, the electronic apparatus 100 may display the invitation UI 603 corresponding to the friend 1 on the second area 602. Here, when a user input for selecting the invitation UI 603 is received, the electronic apparatus 100 may transmit a request signal requesting the same content viewing mode to the friend 1. Here, because an external terminal device of the friend 1 is in a power-on state (connected state), the request signal may include a control signal for displaying a notification message on a display of the external terminal device of the friend 1. The friend 1 may determine whether to accept the request for the same content viewing mode on the basis of the notification message.

According to another embodiment, the electronic apparatus 100 may display the invitation UI 604 corresponding to the friend 2 on the second area 602. Here, when a user input for selecting the invitation UI 604 is received, the electronic apparatus 100 may transmit a request signal requesting the same content viewing mode to the friend 2. However, because an external terminal device of the friend 2 is in a power-off state (non-connected state), it may be difficult to immediately display a notification message on a display of the external terminal device of the friend 2. Here, for example, the electronic apparatus 100 may transmit a request signal to the external terminal device (e.g., a TV) of the friend 2. Here, the request signal may include a control signal for turning on the external terminal device of the friend 2 and a control signal for displaying the notification message after the external terminal device 200 is turned on. As another example, the electronic apparatus 100 may transmit the request signal to an additional external terminal device (e.g., a smart phone) of the friend 2. Here, the request signal may be a signal for displaying a notification message instructing to turn on the external terminal device (TV) and indicating that there is a request for the same content viewing mode. Other embodiments related thereto will be described with reference to FIGS. 22 and 23 below.

Figure 7:
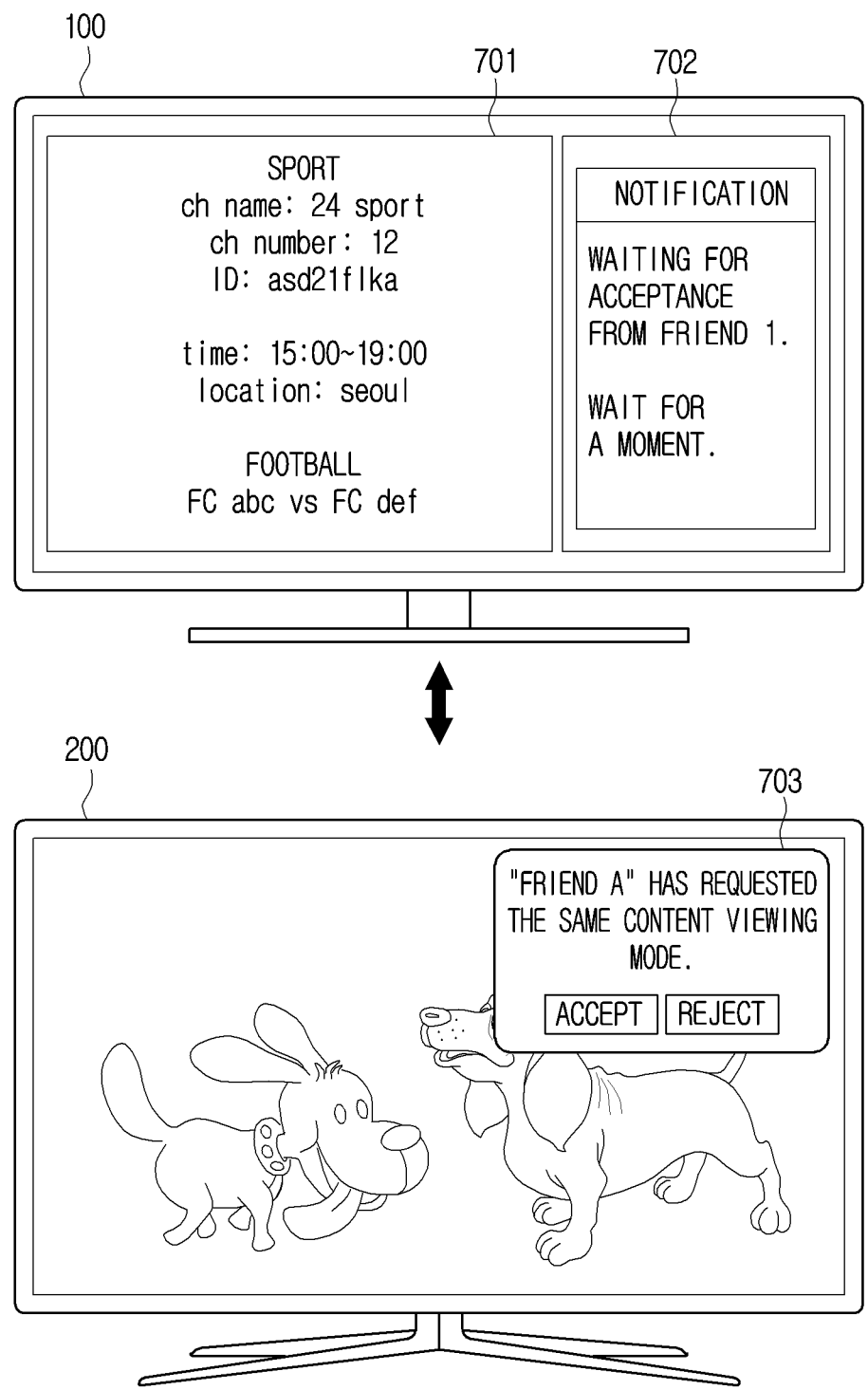
FIG. 7 is a diagram for describing transmitting a request message for the same content viewing mode to an external terminal device and displaying a notification message on the external terminal device according to an embodiment of the disclosure.

FIG. 7 is a diagram for describing transmitting a request message for the same content viewing mode to an external terminal device and displaying a notification message on the external terminal device.

Referring to FIG. 7, an electronic apparatus 100 may transmit a request signal to an external terminal device 200, and the request signal may include a control command to display a notification message.

When an input for selecting the UI 603 of FIG. 6 is received from a user, the electronic apparatus 100 may display information corresponding to selected content on a first area 701 of a display 110 and display a notification message instructing to wait for an acceptance from a friend 1 on a second area 702 of the display 110.

Here, the external terminal device 200 may receive a request signal from the electronic apparatus 100 and display a notification message 703 included in the request signal. When an input instructing a user of the external terminal device 200 to select an acceptance UI included in the notification message 703 is received, the external terminal device 200 may transmit a response signal to the electronic apparatus 100. Thereafter, the external terminal device 200 may perform the same content viewing mode.

Figure 8:
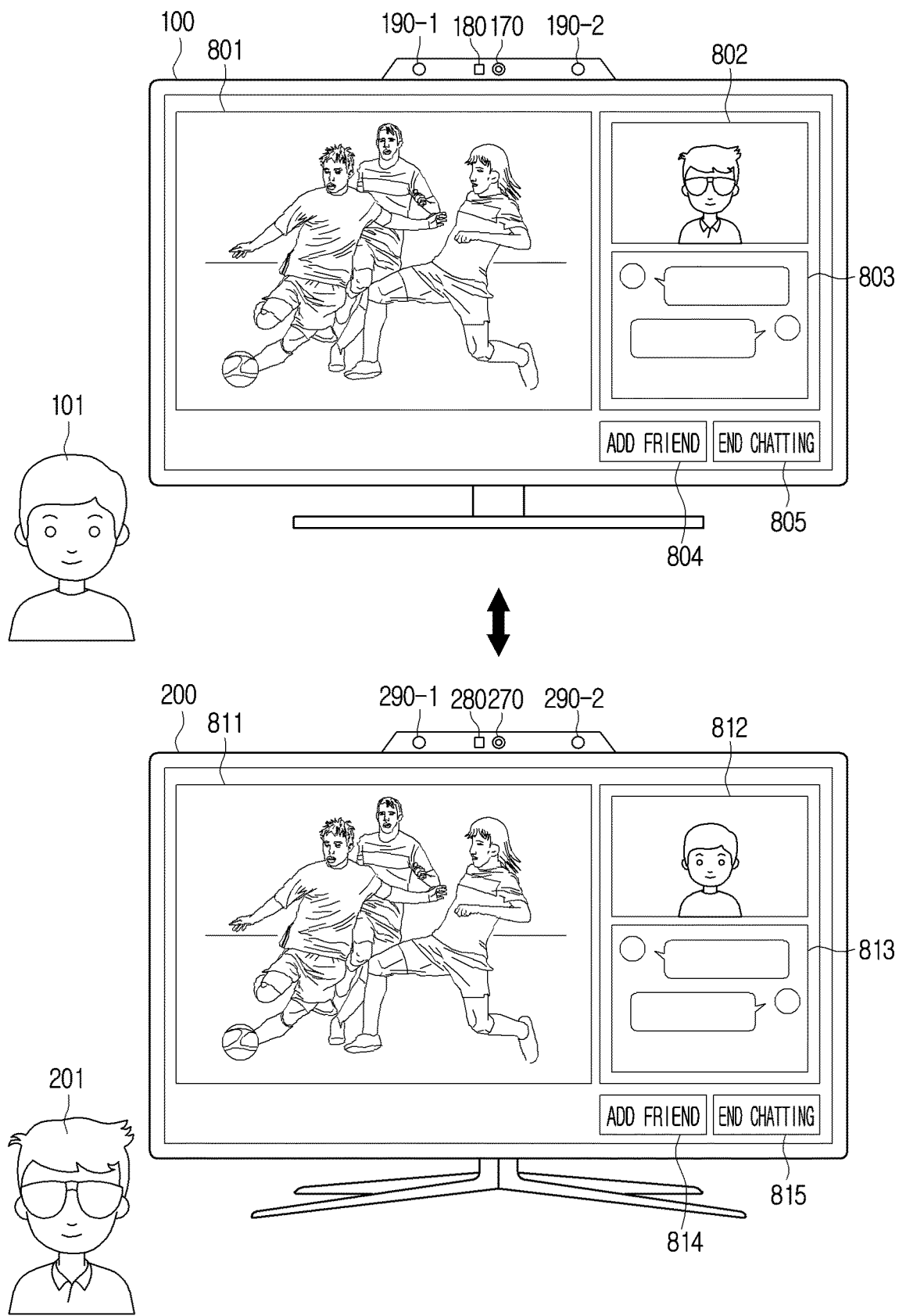
FIG. 8 is a diagram for describing displaying a captured image of each user on an electronic apparatus and an external terminal device according to an embodiment of the disclosure.

FIG. 8 is a diagram for describing displaying a captured image of each user on an electronic apparatus and an external terminal device.

Referring to FIG. 8, an electronic apparatus 100 may include a camera 170, a microphone 180, a first speaker 190-1, and a second speaker 190-2. An external terminal device 200 may include a camera 270, a microphone 280, a first speaker 290-1, and a second speaker 290-2.

It is assumed that a first user 101 of the electronic apparatus 100 and a second user 201 of the external terminal device 200 use the same content viewing mode.

The electronic apparatus 100 may display content (selected content), for which the same content viewing mode is performed, on a first area 801 of the display 110. The electronic apparatus 100 may display a captured image of a second user 201 on a second area 802. Here, the captured image of the second user 201 may be obtained by the camera 270 of the external terminal device 200. The electronic apparatus 100 may display a chat with the second user 201 on a third area 803. The electronic apparatus 100 may display a UI 804 for adding other users in addition to the second user 201 who also uses the same content viewing mode. The electronic apparatus 100 may also display a UI 805 for ending the same content viewing mode.

The external terminal device 200 may display content (selected content), for which the same content viewing mode is performed, on a first area 811 of a display thereof. The external terminal device 200 may display a captured image of the first user 101 on a second area 812. Here, the captured image of the first user 101 may be obtained by the camera 170 of the electronic apparatus 100. The external terminal device 200 may display a chat with the first user 101 on a third area 813. The external terminal device 200 may display a UI 804 for adding other users in addition to the first user 101 who also uses the same content viewing mode. In addition, the external terminal device 200 may also display a UI 815 for ending the same content viewing mode.

Meanwhile, in the embodiment of FIG. 8, a microphone and a speaker may not be included in the electronic apparatus 100 and the external terminal device 200.

FIG. 9 is a diagram for describing a process of receiving a user's voice from an electronic apparatus and converting it into text data.

Referring to FIG. 9, an electronic apparatus 100 may obtain uttered voice of a first user 101 through a microphone 180. The electronic apparatus 100 may convert the obtained uttered voice into audio data. The electronic apparatus 100 may convert the audio data into text data using a voice recognition module. Here, the voice recognition module is capable of converting a digital voice signal into text information by using a speech to text (STT) function. According to an embodiment, the voice recognition module may be stored in an external server rather than the electronic apparatus 100. The STT function may be performed by the external server.

The electronic apparatus 100 may display selected content on a first area 901 of the display 110, display a captured image of a second user 201 on a second area 902, and display text data corresponding to uttered voice of a first user 101 on a third area 903. For example, when the first user 101 utters "hello", the electronic apparatus 100 may convert the uttered voice of the first user 101 into text data and display the text data on the third area 903.

Similarly, in the external terminal device 200, the text data corresponding to the uttered voice of the first user 101 may be displayed on the third area 813 of FIG. 8. When the uttered voice of the first user 101 is directly output through a speaker of the external terminal device 200, the uttered voice may overlap audio data of content and thus the electronic apparatus 100 may control the uttered voice of the first user 101 to be displayed in the form of text data. The second user 201 does not listen to the audio data corresponding to the content and audio data corresponding to the uttered voice of the first user 101 at the same time and thus may not be interrupted during viewing of the content.

Figure 10:
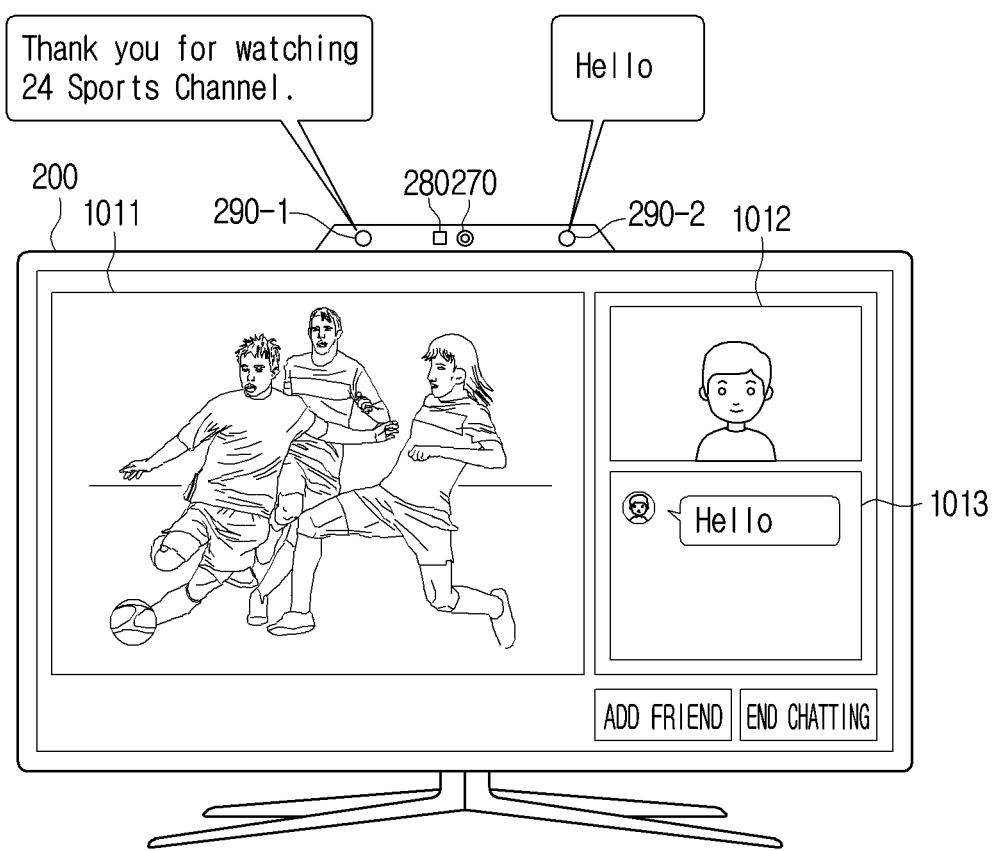
FIG. 10 is a diagram for describing conducting a voice chat in an electronic apparatus and an external terminal device according to an embodiment of the disclosure.

FIG. 10 is a diagram for describing conducting a voice chat between an electronic apparatus and an external terminal device.

Referring to FIG. 10, a first user 101 and a second user 201 may be doing a voice chat together. An example in which uttered voice of the first user 101 is converted into text data and the text data is displayed on a display has been described above in the embodiment of FIG. 9. However, the first user 101 and the second user 201 may desire to do a voice chat rather than a text chat. For a voice chat, audio data corresponding to content and audio data corresponding to a user's uttered voice should be output simultaneously. Accordingly, the electronic apparatus 100 and the external terminal device 200 according to an embodiment of the disclosure may include a plurality of speakers, and the plurality of speakers may be set to output audio data of different sources.

For example, the external terminal device 200 may output audio data corresponding to content through the first speaker 290-1 and output audio data corresponding to the uttered voice of the first user 101 through the second speaker 290-2. The external terminal device 200 may display the content on a first area 1011 of a display and a captured image of the first user 101 on a second area 1012 of the display. According to an embodiment, the external terminal device 200 may display text data corresponding to the uttered voice of the first user 101 on a third area 1013. The external terminal device 200 may additionally display the text data corresponding to the uttered voice of the first user 101 to prevent the second user 201 from failing to exactly recognizing the uttered voice of the first user 101 although the audio data corresponding to the uttered voice of the first user 101 is output through the second speaker 290-2.

Likewise, the electronic apparatus 100 may output audio data corresponding to content through the first speaker 190-1 and output audio data corresponding to uttered voice of the second user 201 through the second speaker 190-2. Meanwhile, the electronic apparatus 100 may display content on the first area 901 of the display 110 and a captured image of the first user 101 on the second area 902 of the display 110. According to an embodiment, the electronic apparatus 100 may display text data corresponding to the uttered voice of the second user 201 on the third area 903.

FIG. 11 is a diagram for describing ending the same content viewing mode.

Referring to FIG. 11, an electronic apparatus 100 may display a UI 1101 indicating that a chat will end when a chat ending input is received from a counterpart (a second user 201). Here, the chat ending input may be an input for selecting the UI 805 or 815 of FIG. 8. Specifically, the UI 1101 indicating that the chat will end may include a message indicating that the same content viewing mode will end after a predetermined time.

When the chat ending input is received from the other party (the second user 201), the electronic apparatus 100 may end the same content viewing mode and display selected content on an entire area of the display 110. Therefore, although the same content viewing mode is ended, content that is being viewed may be continuously provided to the first user 101.

Figure 12:
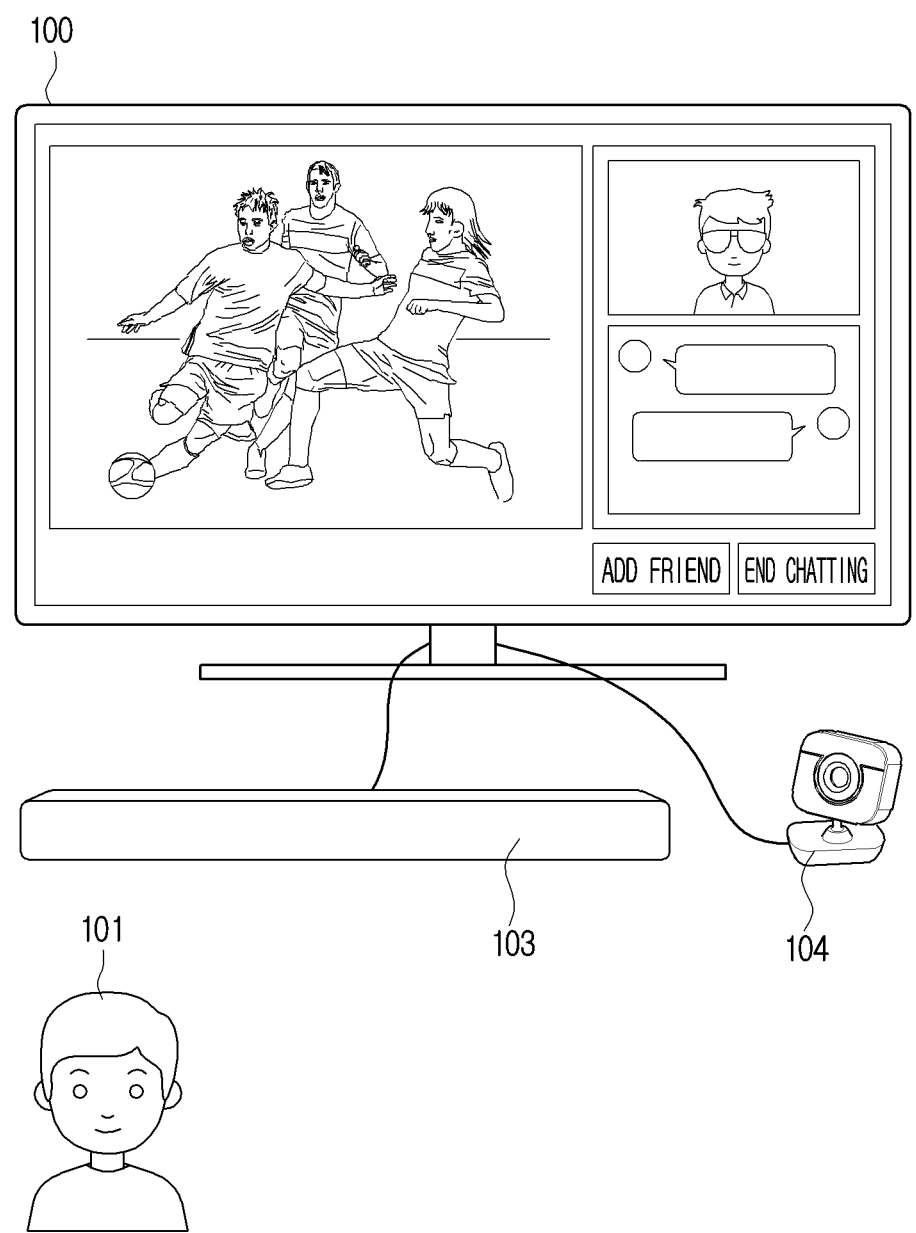
FIG. 12 is a diagram for describing an operation in which an electronic apparatus uses an external camera and an external speaker, according to another embodiment of the disclosure.

FIG. 12 is a diagram for describing an operation in which an electronic apparatus uses an external camera and an external speaker, according to another embodiment.

Referring to FIG. 12, an electronic apparatus 100 may obtain a captured image of a first user 101 by using an external camera 104 instead of an internal camera. In addition, the electronic apparatus 100 may output audio data by using an external speaker 103 instead of an internal speaker.

Figure 13:
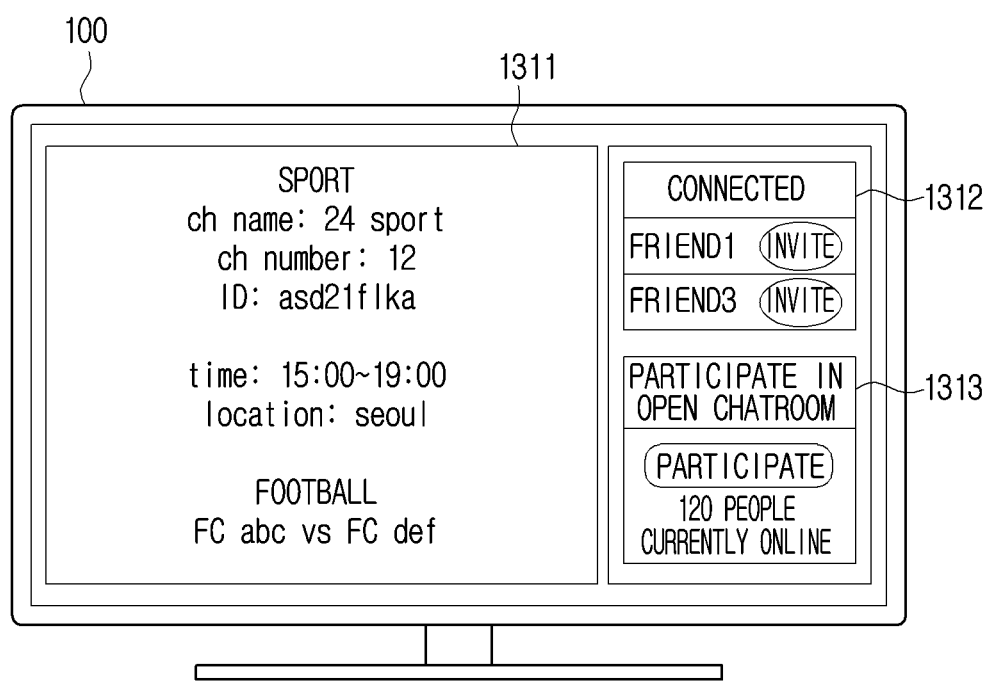
FIG. 13 is a diagram for describing using the same content viewing mode with an unregistered user according to an embodiment of the disclosure.

FIG. 13 is a diagram for describing using the same content viewing mode with an unregistered user.

Referring to FIG. 13, an electronic apparatus 100 may display information corresponding to selected content on a first area 1311 of a display 110 and display a list of other users who are online on a second area 1312. In addition, the electronic apparatus 100 may display a list of other users who are viewing the selected content among unregistered other users on a third area 1313. A first user 101 may use the same content viewing mode for the selected content, together with unregistered other users. That is, the first user 101 may view the selected content while chatting with unregistered other users.

FIG. 14 is a diagram for describing using the same content viewing mode with at least three users.

Referring to FIG. 14, at least three users may use the same content viewing mode. It is assumed that two other users use the same content viewing mode in addition to the first user 101. The electronic apparatus 100 may display content on a first area 1411 of a display 110, display captured images of two other users on a second area 1412 of the display 110, and display chat between the two other users on a third area 1413 of the display 110.

Figure 15:
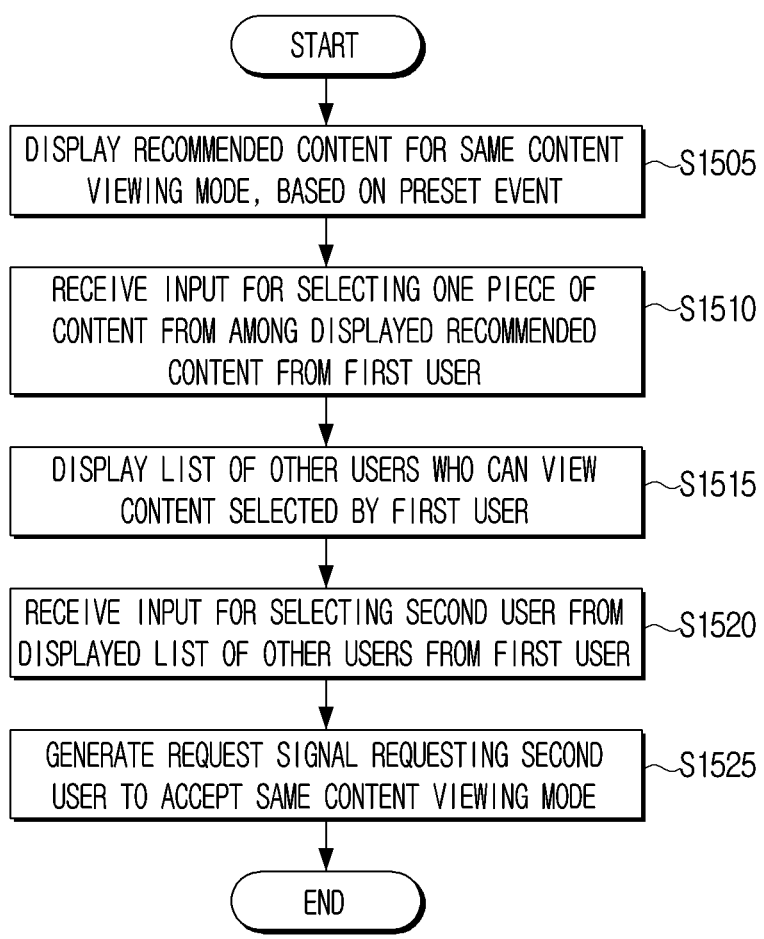
FIG. 15 is a flowchart of using the same content viewing mode according to an embodiment of the disclosure.

FIG. 15 is a flowchart of using the same content viewing mode.

Referring to FIG. 15, the electronic apparatus 100 may display recommended content for the same content viewing mode on the basis of a preset event (S1505). Here, the preset event may be an event causing a user to click a home menu or select an application for the same content viewing mode. The displaying of the recommended content has been described above with reference to FIG. 5.

Next, the electronic apparatus 100 may receive an input for selecting a piece of content from among the displayed recommended content from a first user (S1510). Next, the electronic apparatus 100 may display a list of other users who can view the content selected by the first user (S1515). The displaying of the list of other users has been described above with reference to FIG. 6.

Next, the electronic apparatus 100 may receive an input for selecting a certain user (a second user) from the displayed list of other users from the first user (S1520). Thereafter, the electronic apparatus 100 may generate a signal (request signal) requesting the user (the second user) selected by the first user to accept the same content viewing mode (S1525).

Figure 16:
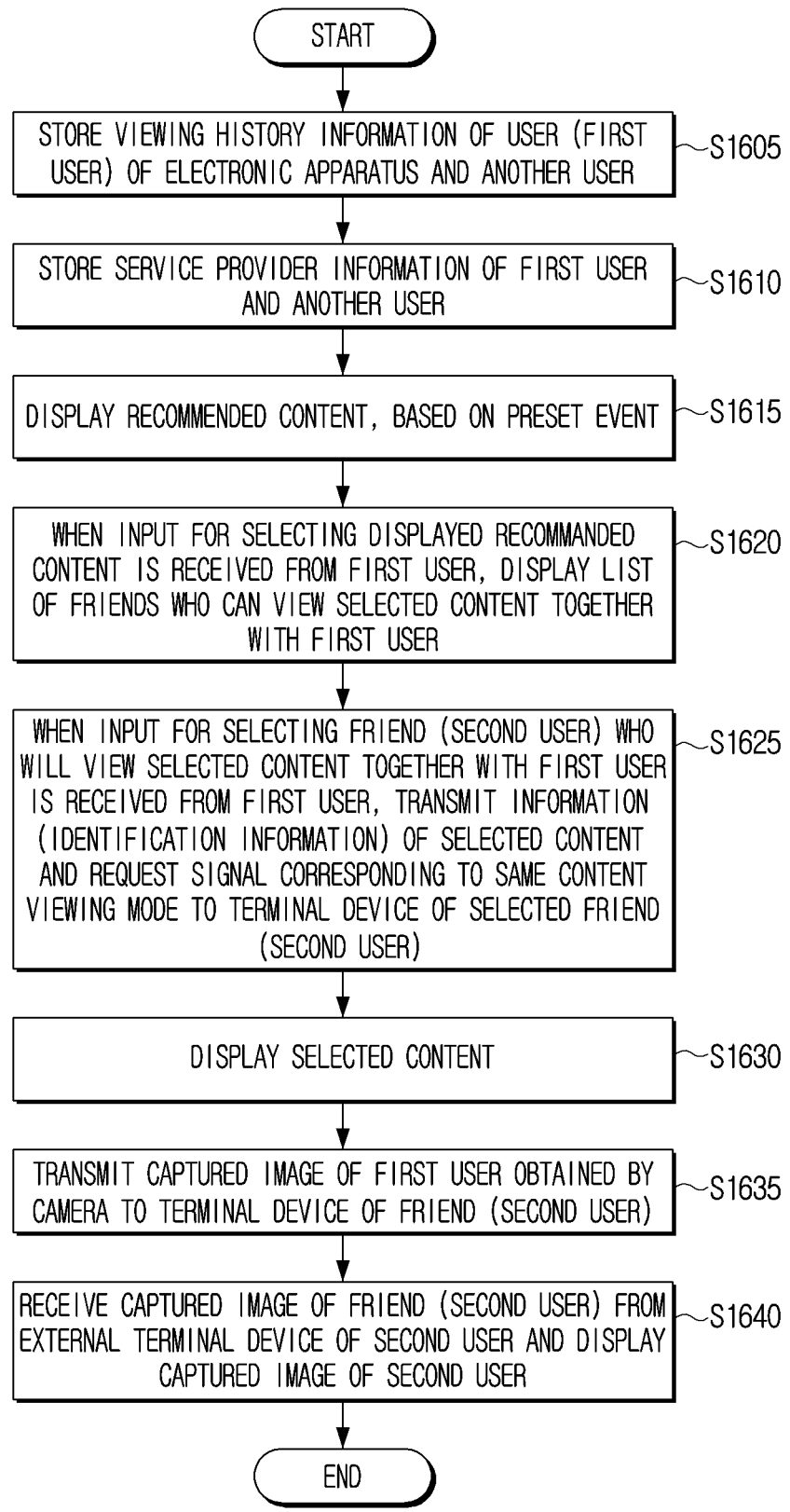
FIG. 16 is a detailed flowchart of using the same content viewing mode according to an embodiment of the disclosure.

FIG. 16 is a detailed flowchart of using the same content viewing mode.

Referring to FIG. 16, the electronic apparatus 100 may store viewing history information of a user (a first user 101) of the electronic apparatus 100 and another user (S1605). Next, the electronic apparatus 100 may store service provider information of the user of the electronic apparatus 100 and service provider information of the other user (S1610). Here, the service provider information may include at least one of service provider identification information, service identification information, or service content information. Next, the electronic apparatus 100 may display recommended content on the basis of a preset event (S1615). Here, operation S1615 corresponds to operation S1505 and thus a redundant description is omitted here.

Next, when an input for selecting the displayed selected content is received from the first user 101, the electronic apparatus 100 may display a list of friends (list of other users) who can view the selected content together with the first user (S1620). When an input for selecting a friend (second user 201) who will view the selected content together with the first user 101 is received from the first user 101, the electronic apparatus 100 may transmit information (identification information) of the selected content and a request signal corresponding to the same content viewing mode to a terminal device of the selected friend (second user 201) (S1625).

When a response signal accepting the same content viewing mode is received from the second user 201, the electronic apparatus 100 may display the selected content (S1630). Next, the electronic apparatus 100 may transmit a captured image of the first user 101 obtained by a camera to the terminal device of the second user 201 (S1635). Thereafter, the electronic apparatus 100 may receive a captured image of the second user 201 from the terminal device (the external terminal device 200) of the second user 201 and display the captured image of the second user 201 (S1640).

Figure 17:
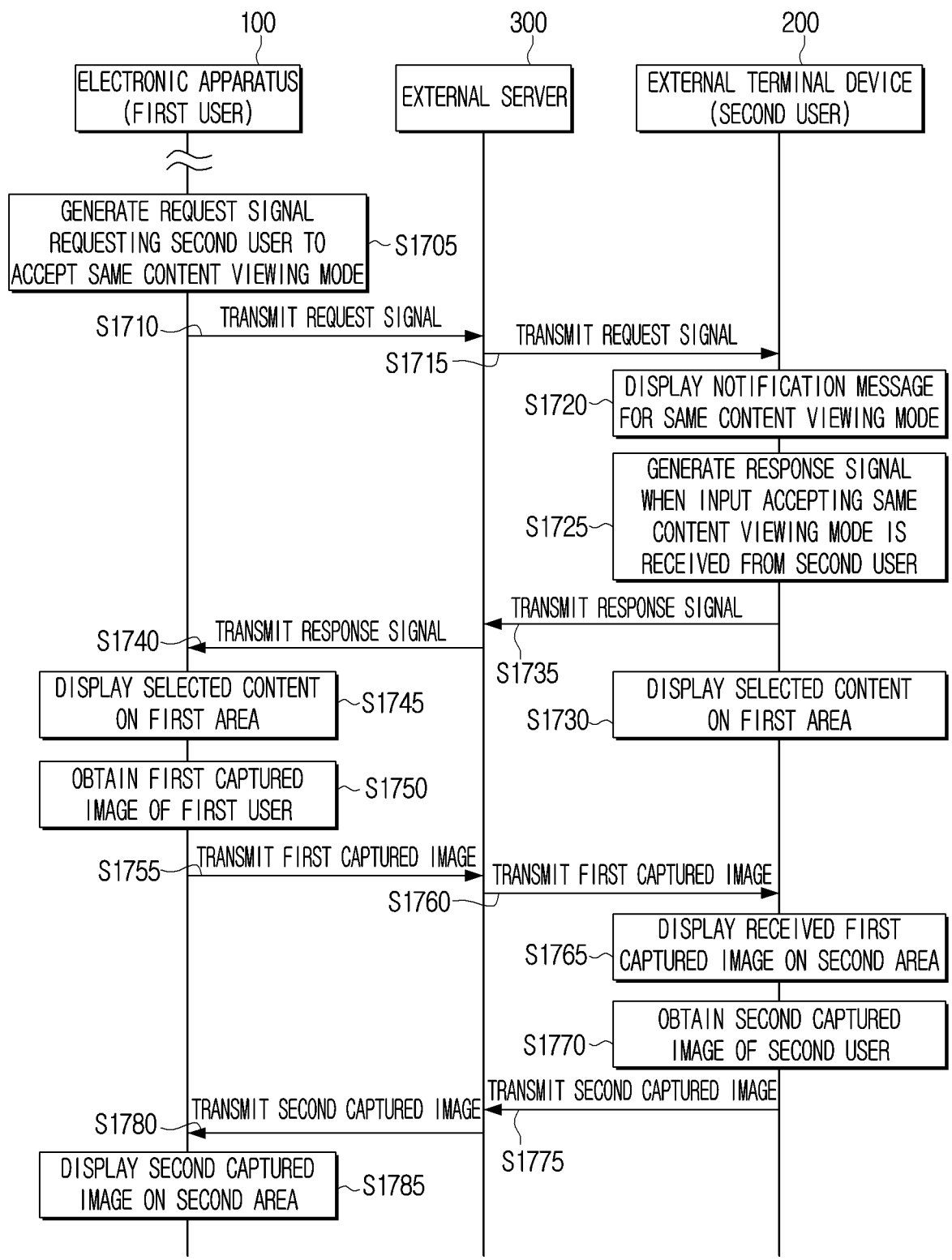
FIG. 17 is a flowchart for describing a system for performing the same content viewing mode, according to an embodiment of the disclosure.

FIG. 17 is a flowchart for describing a system for performing the same content viewing mode, according to an embodiment.

Referring to FIG. 17, an electronic apparatus 100 may generate a request signal requesting a second user 201 to accept the same content viewing mode (S1705). Here, operation S1705 may correspond to step S1525 of FIG. 15, and operations S1505 to S1520 may be performed before operation S1705.

Next, the electronic apparatus 100 may transmit the generated request signal to an external server 300 (S1710). The external server 300 may transmit the request signal to an external terminal device 200 (S1715). The external terminal device 200 may display a notification message for the same content viewing mode on the basis of the received request signal (S1720). Next, when an input accepting the same content viewing mode is received from a second user 201, the external terminal device 200 may generate a response signal corresponding to the input from the second user 201 (S1725). The external terminal device 200 may transmit the generated response signal to the external server 300 (S1735). Next, the external server 300 may transmit the response signal to the electronic apparatus 100 (S1740). When the response signal is received, the electronic apparatus 100 may display the selected content on a first area 801 of the display 110 (S1745). After operation S1725, the external terminal device 200 may display the selected content on the first area 811 of a display of the external terminal device 200 (S1730).

The electronic apparatus 100 may obtain a first captured image of the first user 101 on the basis of the response signal (S1750). Next, the electronic apparatus 100 may transmit the obtained first captured image to an external server 300 (S1755). The external server 300 may transmit the first captured image to the external terminal device 200 (S1760). Next, the external terminal device 200 may display the received first captured image on a second area 812 (S1765). Next, the external terminal device 200 may obtain a second captured image of the second user 201 (S1770). The external terminal device 200 may transmit the obtained second captured image to the external server 300 (S1775). Next, the external server 300 may transmit the second captured image to the electronic apparatus 100 (S1780). Thereafter, the electronic apparatus 100 may display the received second captured image on the second area 802 (S1785).

Figure 18:
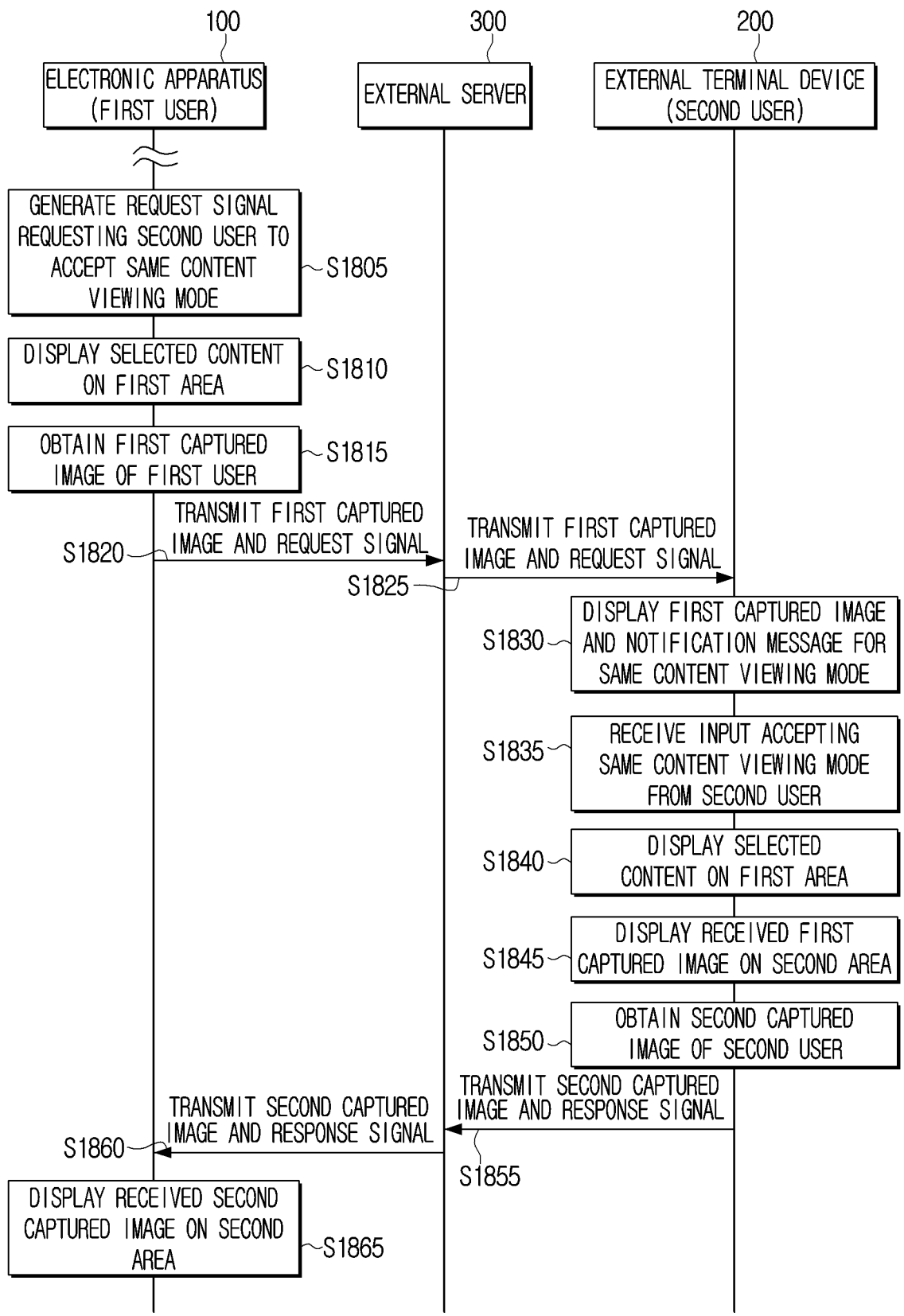
FIG. 18 is a flowchart for describing a system for performing the same content viewing mode, according to another embodiment of the disclosure.

FIG. 18 is a flowchart for describing a system for performing the same content viewing mode, according to another embodiment.

Referring to FIG. 18, an electronic apparatus 100 may generate a request signal requesting a second user 201 to accept the same content viewing mode (S1805). Here, operation S1805 may correspond to operation S1525 of FIG. 15, and operations S1505 to S1520 may be performed before operation S1805.

The electronic apparatus 100 may display selected content on the first area 801 (S1810). Next, the electronic apparatus 100 may obtain a first captured image of the first user 101 (S1815). Next, the electronic apparatus 100 may transmit the first captured image and the request signal to an external server 300 (S1820). The external server 300 may transmit the first captured image and the request signal to the external terminal device 200 (S1825).

The external terminal device 200 may display the first captured image and a notification message for the same content viewing mode (S1830). The second user 201 may easily recognize who has requested the same content viewing mode through the first captured image. Next, the external terminal device 200 may receive an input accepting the same content viewing mode from the second user 201 (S1835). Next, the external terminal device 200 may display the selected content on the first area 811 (S1840). Next, the external terminal device 200 may display the received first captured image on the second area 812 (S1845). Next, the external terminal device 200 may obtain a second captured image of the second user 201 (S1850). Next, the external terminal device 200 may transmit the second captured image and a response signal (including information indicating the acceptance of the same content viewing mode) to the external server 300 (S1855). Next, the external server 300 may transmit the second captured image and the request signal to the electronic apparatus 100 (S1860). Thereafter, the electronic apparatus 100 may display the received second captured image on the second area 802 on the basis of the response signal (S1865).

Figure 19:
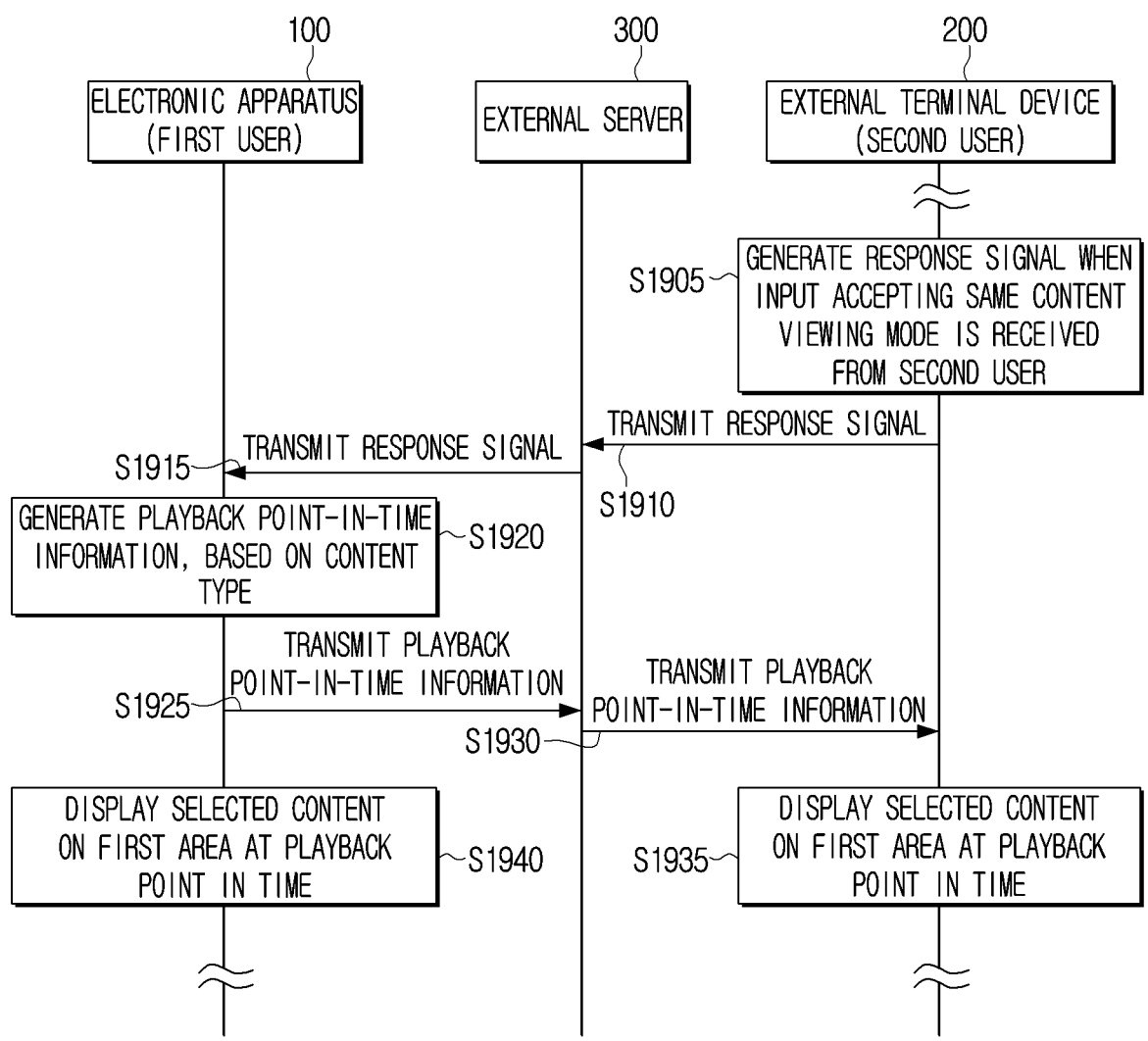
FIG. 19 is a flowchart of generating a playback point-in-time information on the basis of a content type, according to an embodiment of the disclosure.

FIG. 19 is a flowchart of generating a playback point-in-time information on the basis of a content type, according to an embodiment.

Referring to FIG. 19, an external terminal device 200 may generate a response signal when an input accepting the same content viewing mode is received from a second user (S1905). Here, operation S1905 may correspond to operation S1725, and operations S1705 to S1720 may be performed before operation S1905.

The external terminal device 200 may transmit the generated response signal to an external server 300 (S1910). The external server 300 may transmit the response signal to an electronic apparatus 100 (S1915).

Here, the electronic apparatus 100 may generate playback point-in-time information on the basis of a content type (S1920). Here, the playback point-in-time information may be information indicating a point in time when selected content for the same content viewing mode is to be reproduced. Here, the content type may be a broadcast channel or a video on demand (VOD).

For example, a playback point in time may be a current point in time when the selected content is content provided in real time from a broadcast channel.

As another example, the playback point in time may be a predetermined point in time (e.g., one minute), and the predetermined point in time may be changed according to a user's setting, when the selected content is VOD content.

The electronic apparatus 100 may transmit the generated playback point-in-time information to the external server 300 (S1925). Next, the external server 300 may transmit the playback point-in-time information to the external terminal device 200 (S1930). Next, the external terminal device 200 may display the selected content on the first area 811 at the playback point in time on the basis of the received playback point-in-time information (S1935).

Meanwhile, the electronic apparatus 100 may display the selected content on the first area 801 at the playback point in time on the basis of the generated playback point in time (S1940).

Figure 20:
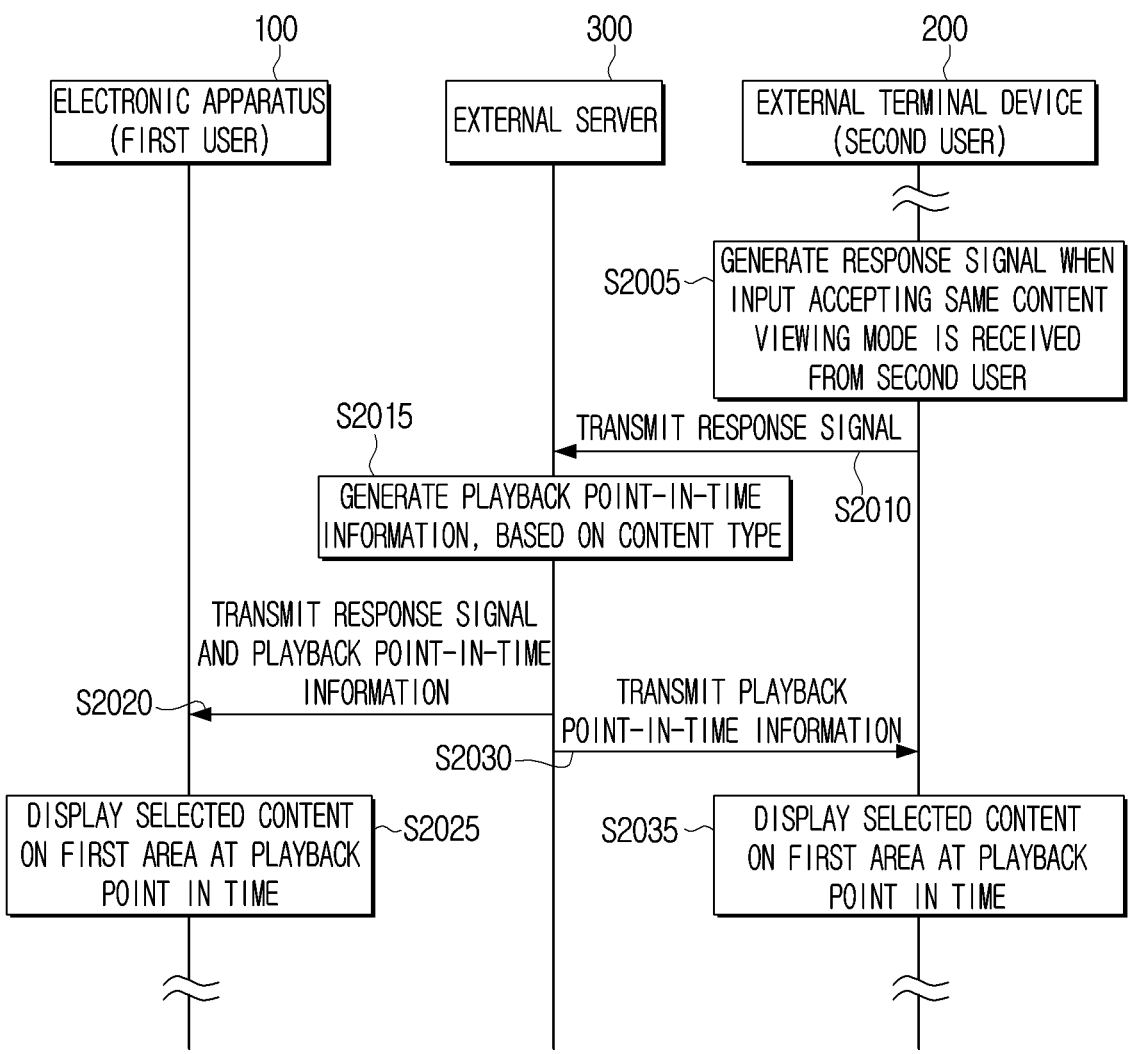
FIG. 20 is a flowchart of generating a playback point-in-time information on the basis of a content type, according to another embodiment of the disclosure.

FIG. 20 is a flowchart of generating playback point-in-time information on the basis of a content type, according to another embodiment.

Referring to FIG. 20, an external terminal device 200 may generate a response signal when an input accepting the same content viewing mode is received from a second user (S2005). Here, operation S2005 may correspond to operation S1725, and operations S1705 to S1720 may be performed before operation S1905.

The external terminal device 200 may transmit the generated response signal to an external server 300 (S2010). Here, the external server 300 may generate playback point-in-time information on the basis of a content type (S2015). Next, the external server 300 may transmit the response signal and the playback point-in-time information to an electronic apparatus 100 (S2020). Next, the electronic apparatus 100 may display selected content on the first area 811 at a playback point in time on the basis of the received playback point-in-time information (S2025). The external server 300 may transmit the playback point-in-time information to the external terminal device 200 (S2030). In addition, the external terminal device 200 may display the selected content on the first area 811 at the playback time on the basis of the received playback point-in-time information (S2035).

Figure 21:
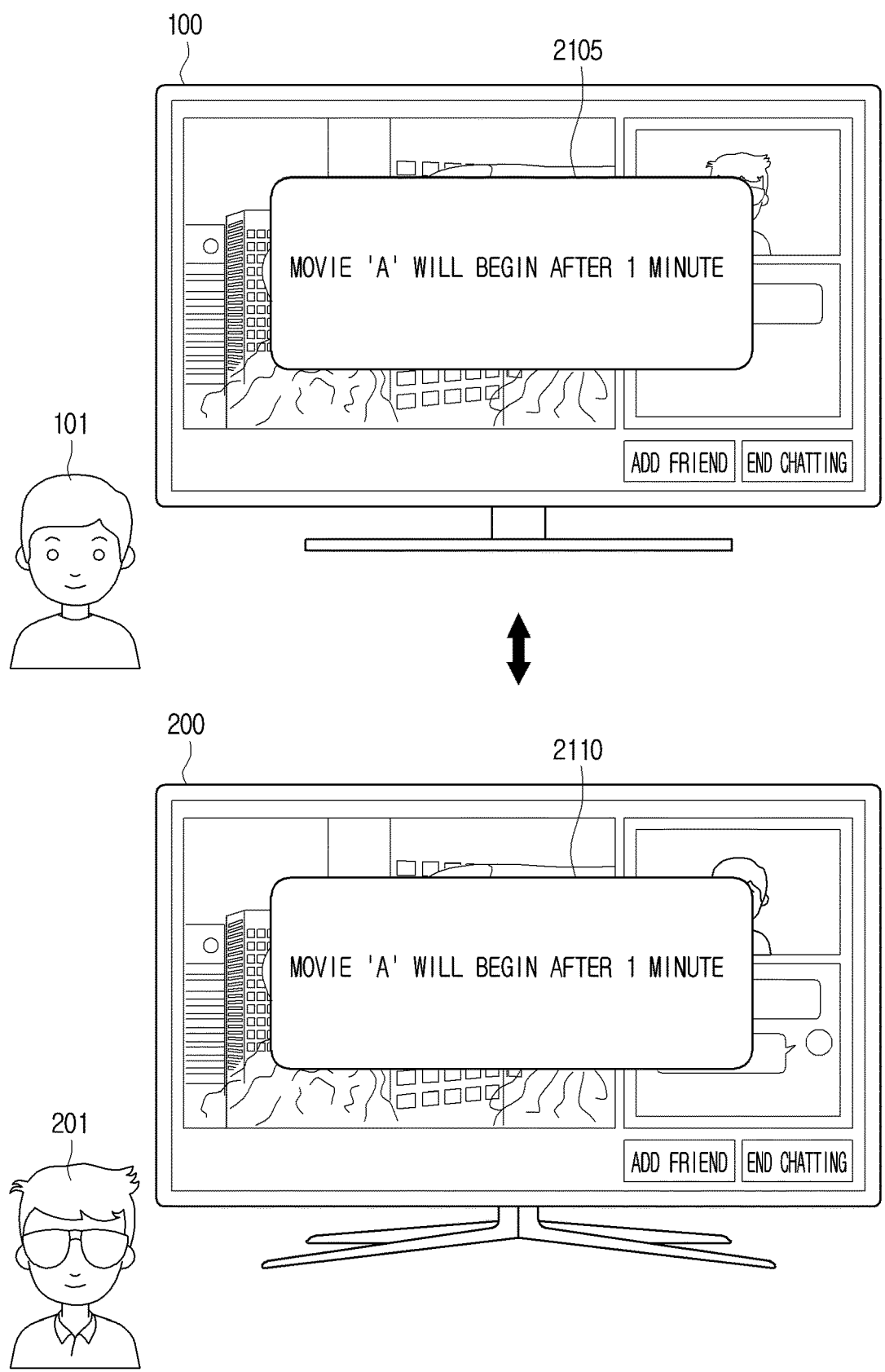
FIG. 21 is a diagram for describing displaying a UI indicating a playback point in time according to an embodiment of the disclosure.

FIG. 21 is a diagram for describing displaying a UI indicating a playback point in time.

Referring to FIG. 21, an electronic apparatus 100 and an external terminal device 200 may simultaneously display content at a playback point in time on the basis of playback point-in-time information. The electronic apparatus 100 may further display a UI 2105 indicating that the content will be displayed at the playback point in time. In addition, the electronic apparatus 100 may generate a control command to display a UI 2110 indicating that the content will be displayed on the external terminal device 200 at the playback point in time and transmit the control command to the external terminal device 200. The external terminal device 200 may display the UI 2110, which indicates that the content will be displayed at the playback point in time, on the display of the external terminal device 200, based on the received control command.

The electronic apparatus 100 and the external terminal device 200 may display a message indicating that selected content will be displayed at a preset point in time (e.g., after one minute) to perform the same content viewing mode.

The embodiment of FIG. 21 may be suitable when the selected content is a VOD. When the selected content is content provided from a broadcast channel, a first user 101 and a second user 201 do not need to be synchronized with each other. Because the broadcast channel is a real-time channel, a time difference occurs hardly. However, in case of VOD content, a screen viewed by the first user 101 and a screen viewed by the second user 201 may be different from each other according to a playback point in time. Therefore, in order to solve this problem, the first user 101 and the second user 201 may share playback point-in-time information, and the electronic apparatus 100 and the external terminal device 200 may simultaneously reproduce the selected content at a determined playback point in time.

Figure 22:
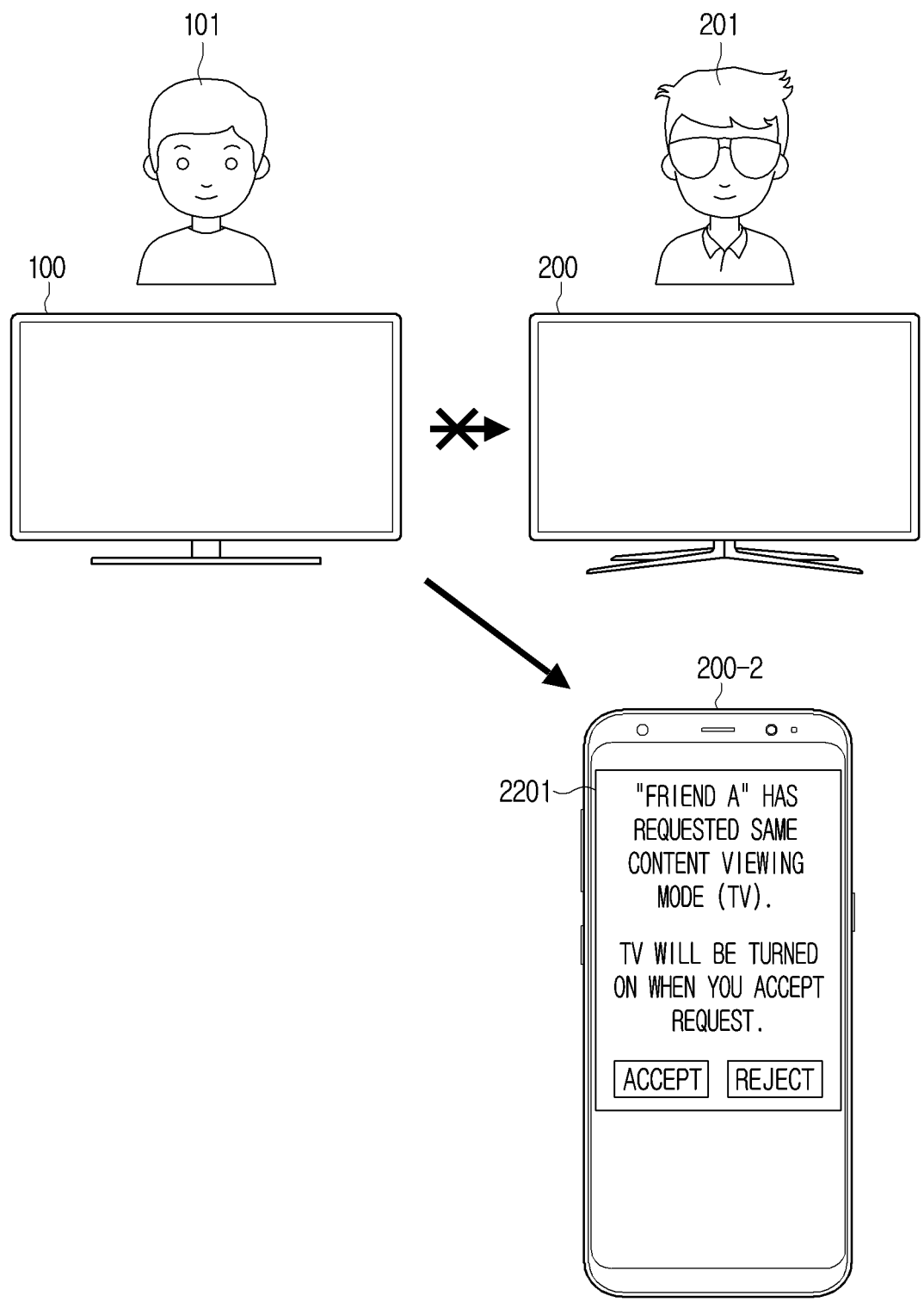
FIG. 22 is a diagram for describing transmitting a notification message to an additional external terminal device according to an embodiment of the disclosure.

FIG. 22 is a diagram for describing transmitting a notification message to an additional external terminal device.

Referring to FIG. 22, it is assumed that an electronic apparatus 100 of a first user 101 is a TV and an external terminal device 200 of a second user 201 is also a TV. Here, it is assumed that the electronic apparatus 100 is turned on and the external terminal device 200 is turned off.

When the first user 101 wants to transmit a request signal requesting the same content viewing mode to the second user 201, it may be difficult for the second user 201 to receive the request signal in a state in which the external terminal device 200 is turned off, and thus, it may be difficult to provide a notification message to the second user 201.

Here, when it is identified that the external terminal device 200 is turned off, the electronic apparatus 100 may transmit the request signal to an additional external terminal device 200-2. In addition, the electronic apparatus 100 may generate a request signal for displaying a notification message 2201 on a display of the additional external terminal device 200-2, and transmit the generated request signal to the additional external terminal device 200-2. Here, the electronic apparatus 100 may use the external server 300 to transmit the request signal.

When an input accepting the same content viewing mode is received by the additional external terminal device 200-2, the additional external terminal device 200-2 may turn on the external terminal device 200, generate a request signal for switching to the same content viewing mode, and transmit the generated request signal to the external terminal device 200. Here, the additional external terminal device 200-2 may be a smart phone or a smart watch that is likely to be carried by the second user 201.

Figure 23:
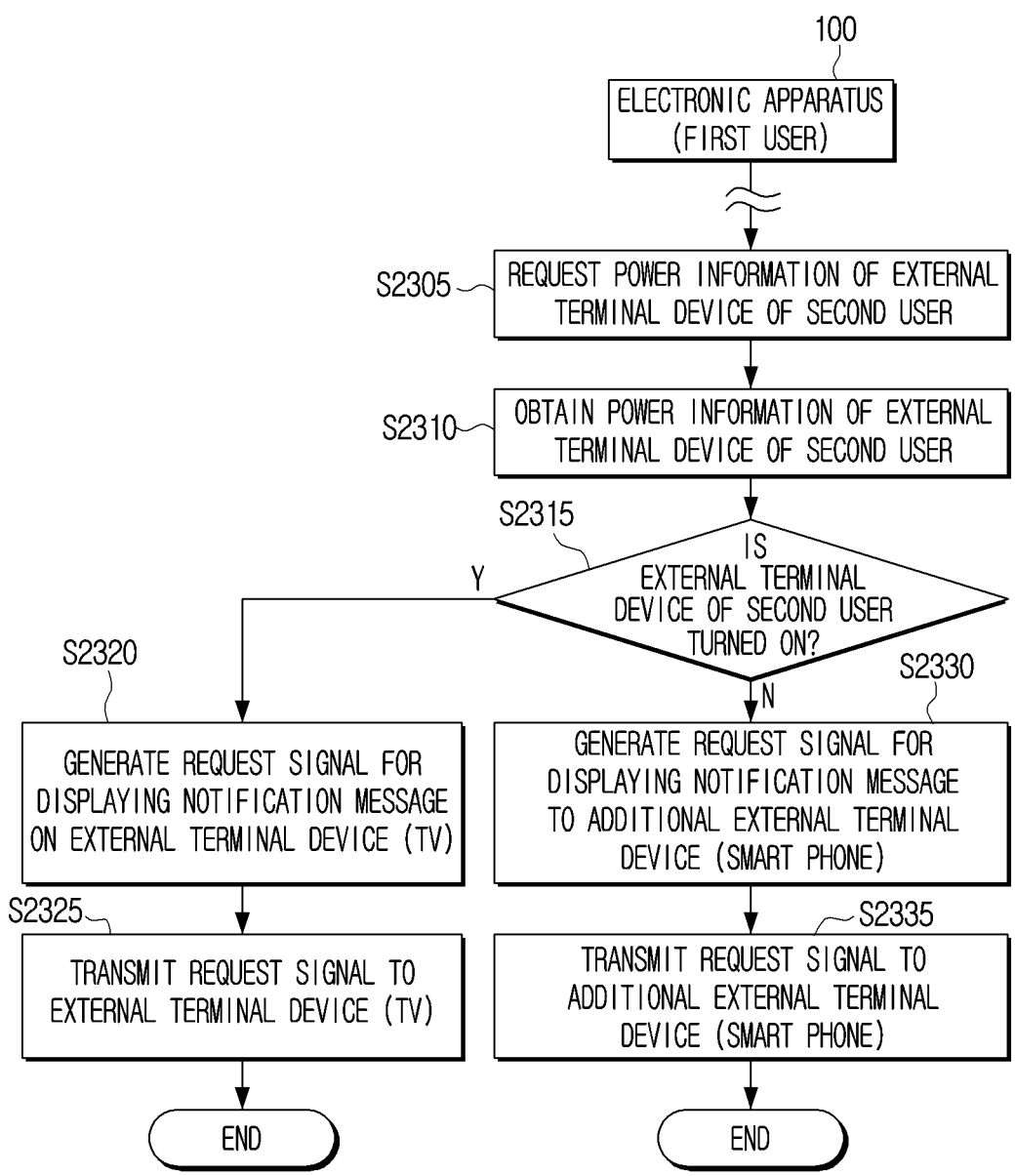
FIG. 23 is a detailed flowchart of FIG. 22 according to an embodiment of the disclosure.

FIG. 23 is a detailed flowchart of FIG. 22.

Referring to FIG. 23, the electronic apparatus 100 may request power information of the external terminal device 200 of the second user 201 (S2305). Here, operations S1505 to S1520 of FIG. 15 may be performed before operation S2305. The electronic apparatus 100 may transmit a control signal for obtaining the power information of the external terminal device 200 to the external server 300. The electronic apparatus 100 may obtain the power information of the external terminal device 200 of the second user 201 through the external server 300 (S2310).

The electronic apparatus 100 may identify whether the external terminal device 200 is turned on, based on the obtained power information (S2315). When it is identified that the external terminal device 200 is turned on, the electronic apparatus 100 may generate a request signal for displaying a notification message on the external terminal device 200 (S2320). The electronic apparatus 100 may transmit the request signal to the external terminal device 200 (S2325). Here, the electronic apparatus 100 and the external terminal device 200 may be TVs.

When it is identified that the external terminal device 200 is turned off, the electronic apparatus 100 may generate a request signal for displaying the notification message to the additional external terminal device 200-2 (S2330). Thereafter, the electronic apparatus 100 may transmit the generated request signal to the additional external terminal device 200-2 (S2335). Here, the additional external terminal device 200-2 may be a portable device such as a smart phone or a smart watch.

Figure 24:
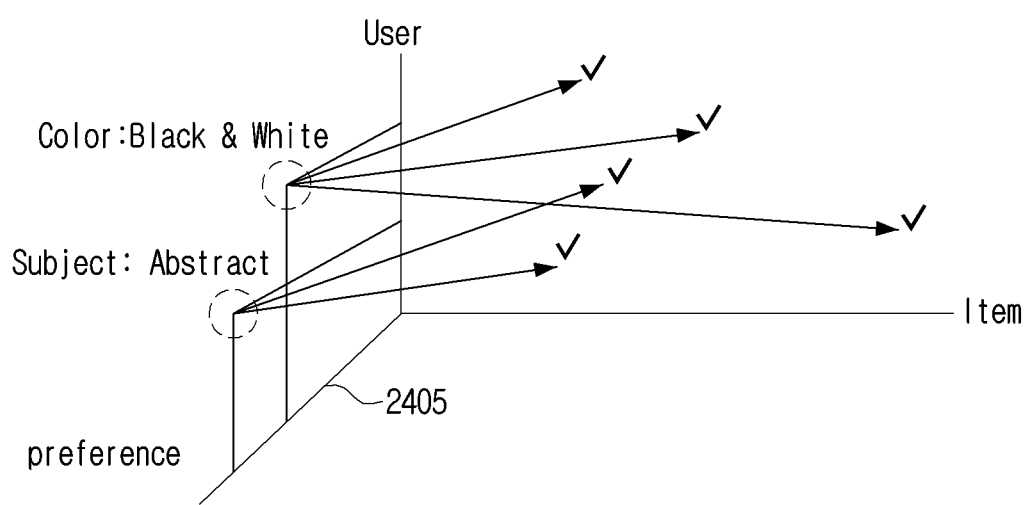
FIG. 24 is a graph for describing a process of determining an item to be recommended according to an embodiment of the disclosure.

FIG. 24 is a graph for describing a process of determining an item to be recommended.

Referring to FIG. 24, a graph 2405 may show a relationship among a user, an item, and a preference. The electronic apparatus 100 may identify recommended content by taking into account a user's preference. Referring to the graph 2405, a first user may prefer content with an abstract subject. The electronic apparatus 100 may identify content with an abstract subject among a plurality of pieces of stored content and determine the identified content as recommended content.

A second user may prefer black and white content. The electronic apparatus 100 may identify content with black and white images among the plurality of pieces of stored content and determine the identified content as recommended content.

Figure 25:
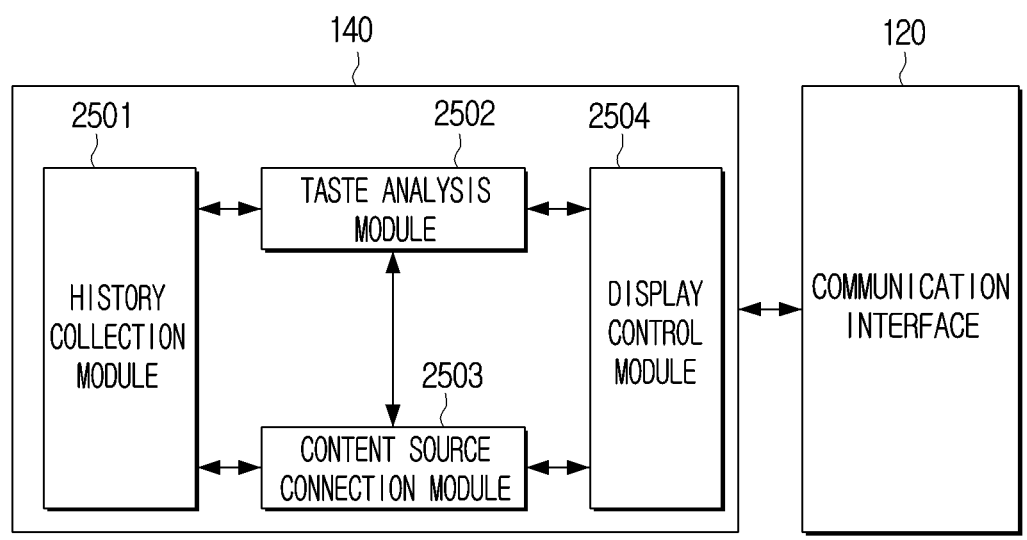
FIG. 25 is a block diagram for describing a module included in an electronic apparatus according to an embodiment of the disclosure.

FIG. 25 is a block diagram for describing a module included in an electronic apparatus according to an embodiment of the disclosure.

Referring to FIG. 25, a processor 140 may include a history collection module 2501, a taste analysis module 2502, a content source connection module 2503, and a display control module 2504.

The history collection module 2501 may receive a viewing history of the first user 101 and a viewing history of another user. The viewing history may include at least one of a broadcast viewing history or a VOD viewing history.

The taste analysis module 2502 may determine preferred content of the first user 101 on the basis of viewing histories stored in the history collection module 2501. Specifically, the taste analysis module 2502 may determine, as the preferred content of the first user 101, at least one of preferred content at a current point in time, preferred content at a future point in time, or preferred content (e.g., over-the-top (OTT) content or VOD content) regardless of a time point. The taste analysis module 2502 may determine recommended content on the basis of at least one of a broadcast program (or channel) that has been frequently viewed, a broadcast channel or a genre of a movie that has been repeatedly viewed at intervals of time, or a broadcast channel or a genre of a movie including a frequent-searched-for keyword. Here, when it is identified that the recommended content cannot be determined, the taste analysis module 2502 may determine, as the recommended content of the first user 101, recommended content of other users in a region identified using location information of the first user 101. Here, the taste analysis module 2502 may receive a viewing history from the history collection module 2501.

The content source connection module 2503 may link the same content in real time to a plurality of users using different service providers. The content source connection module 2503 may receive environmental information (or service provider information) from the history collection module 2501 and receive recommended content information from the taste analysis module 2502. Specifically, the content source connection module 2503 may store mapping information and update the mapping information through the external server 300 at predetermined intervals of time. Here, the content source connection module 2503 may obtain identification information corresponding to selected content to a corresponding terminal device, based on the mapping information.

The display control module 2504 may receive recommended content from the taste analysis module 2502 and display the recommended content. When a user input for selecting a piece of content from among the displayed recommended content is received, the display control module 2504 may request the content source connection module 2503 to provide identification information corresponding to the selected content. The display control module 2504 may obtain the identification information corresponding to the selected content from the content source connection module 2503. In addition, the display control module 2504 may transmit the obtained identification information to the external server 300 through the communication interface 120.

FIG. 26 is a table for describing mapping information mapping content and each service provider to each other.

Referring to FIG. 26, mapping information may include a mapping table 2605. The mapping table 2605 may include a content name, a content category, information about content of a service provider, and content identification information.

For example, "24 sport" may be a broadcast channel category and be provided from channel 10 of a first service provider and channel 20 of a second service provider, and identification information thereof may be #b001.

"24 cook" may be a broadcast channel category and be provided from channel 11 of the first service provider and channel 21 of the second service provider, and identification information thereof may be #b002.

"24 news" may be a broadcast channel category and be provided from channel 12 of the first service provider, and identification information thereof may be #b003.

"movie A" may be a VOD category and be provided from the first service provider and a third service provider, and identification information thereof may be #v001.

The electronic apparatus 100 may obtain identification information corresponding to selected content on the basis of the mapping table included in the mapping information. In addition, the electronic apparatus 100 may include the identification information in a request signal, and transmit the request signal to the external terminal device 200, together with information related to the selected content. The external terminal device 200 may identify the selected content corresponding to the received identification information on the basis of a previously stored mapping table. In addition, the external terminal device 200 may provide a channel or a VOD corresponding to the identified selected content.

Figure 27:
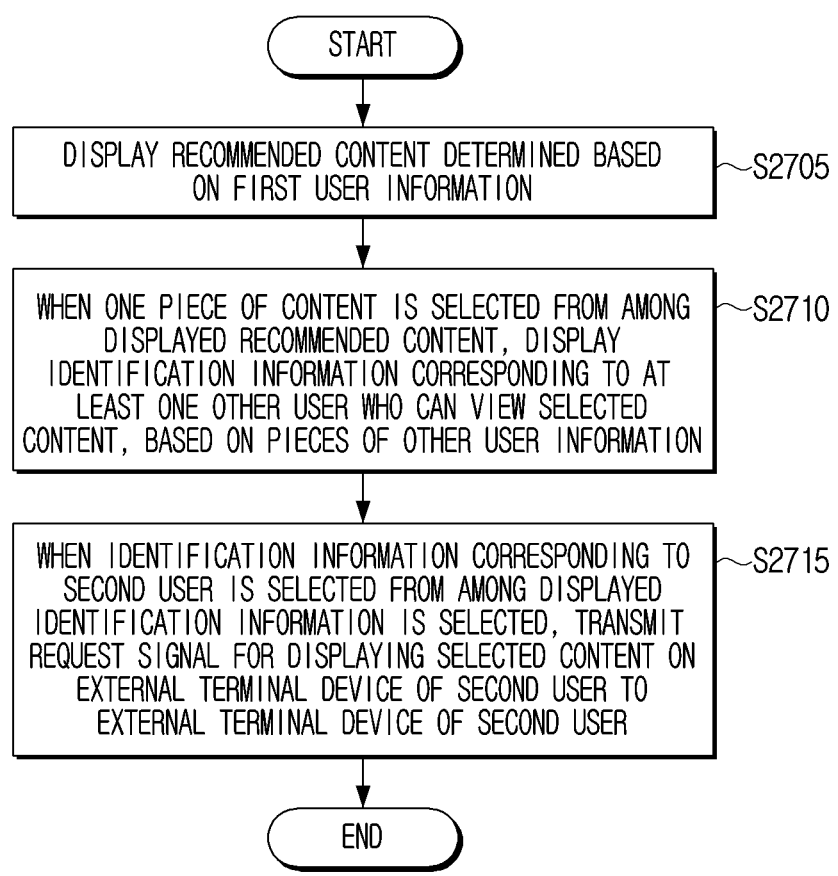
FIG. 27 is a flowchart of a control method of an electronic apparatus according to an embodiment of the disclosure according to an embodiment of the disclosure.

FIG. 27 is a flowchart of a control method of an electronic apparatus according to an embodiment of the disclosure.

Referring to FIG. 27, a control method of the electronic apparatus 100 that stores first user information and a plurality of pieces of other user information according to an embodiment of the disclosure may include displaying recommended content determined based on first user information (S2705), when a piece of content is selected from among the displayed recommended content, displaying identification information corresponding to at least one other user who can view the selected content on the basis of the plurality of pieces of other user information (S2710), and when identification information corresponding to a second user is selected from among the displayed identification information, transmitting a request signal for displaying the selected content on the external terminal device 200 of the second user to the external terminal device 200 of the second user (S2715).

Meanwhile, each of the first user information and the plurality of pieces of other user information may include history information and service provider information, the service provider information may include at least one of service provider identification information, service provider control command information, content identification information, or content detail information, the displaying of the recommended content (S2705) may include identifying pieces of preferred content on the basis of the history inform of the first user and identifying, as recommended content, content to be viewed at a current point in time among the identified pieces of preferred content on the basis of the service provider information of the first user, and the displaying of the identification information corresponding to the at least one other user (S2710) may include obtain identification information corresponding to at least one other user who can view the selected content on the basis of the service provider information of the plurality of other users.

The control method may further include displaying the selected content on a first area of the display 110 of the electronic apparatus 100 when a response signal is received from the external terminal device 200 of the second user, and displaying a captured image of the second user on a second area of the display 110 when the captured image of the second user is received.

The control method may further include displaying text information input by the second user on a third area of the display 110 when the text information is received from the external terminal device 200 of the second user.

In displaying of the selected content on the first area of the display 110 of the electronic apparatus 100, a screen size of the selected content may be changed to correspond to a size of the first area, and the selected content may be displayed on the first area on the basis of the changed screen size, when a response signal is received from the external terminal device 200 of the second user.

The control method may further include obtaining a captured image of the first user when the response signal is received from the external terminal device 200 of the second user, and transmitting the captured image of the first user to the external terminal device 200 of the second user.

The plurality of pieces of other user information may include history information and service provider information of the plurality of other users, and the displaying of the identification information corresponding to the at least one other user (S2710) may include identifying at least one other use who prefers the selected content on the basis of the history information of the plurality of other users, and displaying identification information corresponding to at least one other user who can view the selected content among the at least one other user who prefers the selected content, based on the service provider information of the plurality of other users.

In the transmitting of the request signal to the external terminal device 200 of the second user (S2715), identification information corresponding to the selected content and a request signal for displaying the selected content on the external terminal device 200 of the second user may be transmitted to the external terminal device 200 of the second user on the basis of mapping information for mapping between the service provider information of the first user and the service provider information of the plurality of other users.

The control method may further include displaying a notification message on the basis of a reserved event, and transmitting to the external terminal device 200 a request signal for displaying content corresponding to the reserved event on the external terminal device 200 of the second user when a user input corresponding to the displayed notification message is received.

The control method may further include receiving data related to the plurality of other users from the external server 300 and updating the plurality of pieces of other user information on the basis of the received data.

Meanwhile, the control method of an electronic apparatus as shown in FIG. 27 may be performed by an electronic apparatus having a configuration as shown in FIG. 2 or 3 or an electronic apparatus having a different configuration.

Meanwhile, the methods according to the various embodiments of the disclosure described above may be implemented in the form of an application installable in existing electronic apparatuses.

The methods according to the various embodiments of the disclosure may be implemented only by upgrading software or hardware for existing electronic apparatuses.

In addition, the various embodiments of the disclosure may be implemented by a server embedded in an electronic apparatus or an external server of at least one of the electronic apparatus or a display device.

In an embodiment of the disclosure, the various embodiments described above may be embodied as software including instructions stored in machine (e.g., a computer)-readable storage media. The machine is a device capable of calling an instruction stored in a storage medium and operating according to the called instruction and may include an electronic apparatus according to the embodiments set forth herein. When the instructions are executed by a processor, functions corresponding to the instructions may be performed directly by the processor or performed using other components under control of the processor. The instructions may include code generated or executed by a compiler or an interpreter. The machine-readable storage medium may be provided in the form of a non-transitory storage medium. Here, the term "non-temporary" means that the storage medium does not include a signal and is tangible but does not indicate whether data is stored in the storage medium semi-permanently or temporarily.

In an embodiment of the disclosure, the methods according to the various embodiments described above may be provided in a computer program product. The computer program product may be traded as a product between a seller and a purchaser. The computer program product may be distributed in the form of a machine-readable storage medium (e.g., a compact disc read-only memory (CD-ROM)) or distributed online via an application store (e.g., Playstreet). At least a portion of the computer program product when distributed online may be at least temporarily stored in a storage medium such as a memory of a server of a manufacturer, a server of an application store, or a relay server, or may be temporarily generated.

In addition, each component (e.g., a module or a program) according to the above-described various embodiments may include a single entity or a plurality of entities, and some of the sub-components described above may be omitted or other sub-components may be further included in the various embodiments. Alternatively or additionally, some components (e.g., modules or programs) may be integrated into one entity to perform functions, which are performed by the components prior to the integration, in the same or similar manner. Operations performed by a module, a program, or another component according to various embodiments may be performed in a sequential, parallel, iterative, or heuristic manner, at least some of the operations may be executed in a different order or omitted, or other operations may be added.

While the embodiments of the disclosure have been illustrated and described herein, the disclosure is not limited thereto and various modifications may be made therein by those of ordinary skill in the art without departing from the gist of the disclosure as claimed in the accompanying claims and such modifications should not be understood separately from the scope and spirit of the disclosure.

What is claimed is:

1. An electronic apparatus comprising:
a display;
a communication interface;
a memory to store first user information of a first user corresponding to the electronic apparatus and information of a plurality of other users; and
a processor configured to:
control the display to display recommended content determined based on the first user information;
in response to a content being selected from among the recommended content displayed on the display, control the display to display identification information corresponding to at least one other user, among the plurality of other users, to whom the content selected is displayable based on a respective information of the at least one other user stored among the information of plurality of other users; and
in response to identification information corresponding to a second user being selected from among the displayed identification information corresponding to the at least one other user, control the communication interface to transmit a request signal for a same content viewing mode to an external terminal device corresponding to the second user so that the selected content is displayable on the external terminal device of the second user.

2. The electronic apparatus as claimed in claim 1, wherein the first user information and the information of the plurality of other users comprises history information and service provider information,
wherein the service provider information comprises at least one of service provider identification information, service provider control command information, content identification information, or content detail information, and
the processor is further configured to:
identify a plurality of pieces of preferred content based on the history information of the first user;
identify, as the recommended content, content to be viewable at a current point in time among the identified plurality of pieces of preferred content based on the service provider information of the first user; and obtain identification information corresponding to the at least one other user to whom the content selected is displayable based on the service provider information of the plurality of other users.

3. The electronic apparatus as claimed in claim 1, wherein the processor is further configured to:
control the display to display the content selected on a first area of the display in response to a response signal being received from the external terminal device of the second user through the communication interface; and
in response to a captured image of the second user being received through the communication interface, control the display to display the received captured image of the second user on a second area of the display.

4. The electronic apparatus as claimed in claim 3, wherein, in response to text information input by the second user being received from the external terminal device of the second user through the communication interface, the processor is further configured to control the display to display the received text information on a third area of the display.

5. The electronic apparatus as claimed in claim 3, wherein, in response to the response signal being received from the external terminal device of the second user through the communication interface, the processor is further configured to change a screen size of the content selected to correspond to a size of the first area and control the display to display the content selected on the first area based on the changed screen size.

6. The electronic apparatus as claimed in claim 1, further comprising a camera,
wherein the processor is further configured to:
obtain a captured image of the first user through the camera in response to a response signal being received from the external terminal device of the second user through the communication interface; and
control the communication interface to transmit the obtained captured image of the first user to the external terminal device of the second user.

7. The electronic apparatus as claimed in claim 1, wherein the information of the plurality of other users comprises history information and service provider information of the plurality of other users,
wherein the processor is further configured to:
identify preference for the content selected based on the history information of the plurality of other users; and
control the display to display identification information corresponding to at least one other user with the preference for the content selected to whom the content selected is displayable among at least one other user with preference for the content selected based on the service provider information of the plurality of other users.

8. The electronic apparatus as claimed in claim 7, wherein the memory is further configured to store mapping information in which the service provider information of the first user and the service provider information of the plurality of other users are mapped to each other,
wherein the processor is further configured to transmit, to the external terminal device of the second user, identification information corresponding to the content selected and a request signal to display the content selected on the external terminal device of the second user based on the mapping information.

9. The electronic apparatus as claimed in claim 1, wherein the processor is further configured to:
control the display to display a notification message based on a reserved event; and
in response to a user input corresponding to the displayed notification message being received, control the communication interface to transmit, to the external terminal device of the second user, a request signal to display content corresponding to the reserved event on the external terminal device of the second user.

10. The electronic apparatus as claimed in claim 1, wherein the processor is further configured to:
receive data related to the plurality of other users from an external server through the communication interface; and
update the information of the plurality of other users is based on the received data.

11. A control method of an electronic apparatus comprising:
storing first user information of a first user and information of a plurality of other users;
displaying recommended content determined based on the first user information;
in response to a content being selected from among the displayed recommended content, displaying identification information corresponding to at least one other user, among the plurality of other users, to whom the content selected is displayable based on a respective information of the at least one other user stored among the information of plurality of other users; and
in response to identification information corresponding to a second user being selected from among the displayed identification information corresponding to the at least one other user, transmitting a request signal for a same content viewing mode to an external terminal device corresponding to the second user so that the content selected is displayable on the external terminal device of the second user.

12. The control method as claimed in claim 11, wherein the first user information and the information of the plurality of other users comprises history information and service provider information,
wherein the service provider information comprises at least one of service provider identification information, service provider control command information, content identification information, or content detail information,
the displaying of the recommended content comprises:
identifying a plurality of pieces of preferred content based on the history information of the first user; and
identifying, as the recommended content, content to be viewable at a current point in time among the identified plurality of pieces of preferred content based on the service provider information of the first user, and
the displaying of the identification information corresponding to the at least one other user comprises obtaining identification information corresponding to the at least one other user to whom the content selected is displayable based on the service provider information of the plurality of other users.

13. The control method as claimed in claim 11, further comprising:
displaying the content selected on a first area of the display of the electronic apparatus in response to a response signal being received from the external terminal device of the second user; and in response to a captured image of the second user being received, displaying the received captured image of the second user on a second area of the display.

14. The control method as claimed in claim 13, in response to text information input by the second user being received from the external terminal device of the second user, further comprising displaying the received text information on a third area of the display.

15. The control method as claimed in claim 13, wherein the displaying of the selected content on the first area of the display of the electronic apparatus comprises:
   changing a screen size of the content selected to correspond to a size of the first area, and
   displaying the content selected on the first area based on the changed screen size, in response to a response signal being received from the external terminal device of the second user.

* * * * *